(12) United States Patent
Jung et al.

(10) Patent No.: US 11,672,035 B2
(45) Date of Patent: Jun. 6, 2023

(54) METHOD AND APPARATUS FOR PERFORMING SIDELINK COMMUNICATION BY UE IN NR V2X

(71) Applicant: LG ELECTRONICS INC., Seoul (KR)

(72) Inventors: Sunghoon Jung, Seoul (KR); Heejin Kim, Seoul (KR); Seungmin Lee, Seoul (KR); Youngdae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 120 days.

(21) Appl. No.: 17/043,581

(22) PCT Filed: Jun. 14, 2019

(86) PCT No.: PCT/KR2019/007229
§ 371 (c)(1),
(2) Date: Sep. 29, 2020

(87) PCT Pub. No.: WO2019/240544
PCT Pub. Date: Dec. 19, 2019

(65) Prior Publication Data
US 2021/0029761 A1   Jan. 28, 2021

(30) Foreign Application Priority Data
Jun. 14, 2018  (KR) .................... 10-2018-0067840

(51) Int. Cl.
*H04W 76/14*    (2018.01)
*H04W 4/40*     (2018.01)
(Continued)

(52) U.S. Cl.
CPC ........... *H04W 76/14* (2018.02); *H04L 1/1812* (2013.01); *H04W 4/40* (2018.02); *H04W 28/0268* (2013.01)

(58) Field of Classification Search
CPC ....... H04L 1/1812; H04L 76/14; H04L 76/11; H04L 76/12; H04L 76/18; H04L 76/15;
(Continued)

(56) References Cited

U.S. PATENT DOCUMENTS 9,532,400 B2 * 12/2016 Schmidt ................. H04W 4/70
9,980,173 B2 *  5/2018 Lee ........................ H04L 69/22
(Continued)

FOREIGN PATENT DOCUMENTS

| KR | 20170020145 | 2/2017 |
|---|---|---|
| KR | 20170142407 | 12/2017 |
| WO | 2017/078783 | 5/2017 |

OTHER PUBLICATIONS

PCT International Application No. PCT/KR2019/007229, International Search Report dated Sep. 25, 2019, 2 pages.

*Primary Examiner* — Dung B Huynh
(74) *Attorney, Agent, or Firm* — Lee, Hong, Degerman, Kang & Waimey PC

(57) ABSTRACT

Provided are a method for performing sidelink communication by a first apparatus (9010), and the first apparatus (9010) supporting the same. The method may include: receiving, from a second apparatus (9020), restriction information related to the sidelink communication between the first apparatus (9010) and the second apparatus (9020); and performing the sidelink communication with the second apparatus (9020) based on the restriction information.

15 Claims, 27 Drawing Sheets

(51) Int. Cl.
  *H04L 1/1812* (2023.01)
  *H04W 28/02* (2009.01)
(58) Field of Classification Search
  CPC .. H04L 76/19; H04W 28/0268; H04W 48/02; H04W 72/02; H04W 72/0406; H04W 76/14; H04W 8/005; H04W 4/44; H04W 4/80; H04W 84/12
  See application file for complete search history.

(56) References Cited

U.S. PATENT DOCUMENTS

| | | | |
|---|---|---|---|
| 10,027,729 B2* | 7/2018 | Cheng | H04W 4/70 |
| 10,091,784 B1* | 10/2018 | Liu | H04J 11/00 |
| 10,425,955 B2* | 9/2019 | Pang | H04W 72/543 |
| 10,484,396 B2* | 11/2019 | Peng | H04W 12/06 |
| 10,932,231 B2* | 2/2021 | Zhao | H04W 56/002 |
| 10,965,479 B2* | 3/2021 | Atarius | H04M 15/8016 |
| 2005/0250509 A1* | 11/2005 | Choksi | H04W 72/21 455/436 |
| 2011/0082939 A1* | 4/2011 | Montemurro | H04L 69/24 709/227 |
| 2012/0106517 A1* | 5/2012 | Charbit | H04W 72/04 370/336 |
| 2012/0188981 A1 | 7/2012 | Chang et al. | |
| 2014/0010172 A1* | 1/2014 | Wei | H04W 76/14 370/328 |
| 2014/0036793 A1* | 2/2014 | Johnsson | H04L 67/51 370/329 |
| 2014/0243040 A1* | 8/2014 | Bienas | H04W 76/23 455/552.1 |
| 2014/0254523 A1* | 9/2014 | Chai | H04W 76/14 370/329 |
| 2014/0295765 A1* | 10/2014 | Wei | H04M 1/72412 455/41.2 |
| 2014/0321293 A1* | 10/2014 | Hwang | H04L 1/1893 370/242 |
| 2014/0335906 A1* | 11/2014 | Kim | H04W 4/80 455/509 |
| 2015/0055579 A1* | 2/2015 | Wu | H04L 1/1812 370/329 |
| 2015/0065154 A1* | 3/2015 | Van Phan | H04W 72/042 455/450 |
| 2015/0080002 A1* | 3/2015 | Cho | H04W 8/005 455/450 |
| 2015/0085747 A1* | 3/2015 | Cho | H04W 76/14 370/328 |
| 2015/0087233 A1* | 3/2015 | Kim | H04W 76/14 455/41.2 |
| 2015/0117293 A1* | 4/2015 | Cho | H04W 76/40 370/312 |
| 2015/0163790 A1* | 6/2015 | Lee | H04L 1/1893 370/329 |
| 2015/0264733 A1* | 9/2015 | Guo | H04W 76/27 370/329 |
| 2015/0365976 A1* | 12/2015 | Lee | H04W 76/14 455/422.1 |
| 2016/0007152 A1* | 1/2016 | Johnsson | H04W 72/23 370/329 |
| 2016/0037322 A1* | 2/2016 | Nguyen | H04W 4/70 370/329 |
| 2016/0105915 A1* | 4/2016 | Zhang | H04W 16/14 370/329 |
| 2016/0150584 A1* | 5/2016 | Ohta | H04W 52/0216 370/328 |
| 2016/0183241 A1* | 6/2016 | Lee | H04W 72/0406 455/425 |
| 2016/0219639 A1* | 7/2016 | Agiwal | H04W 76/14 |
| 2016/0255458 A1* | 9/2016 | Huang | H04W 72/52 370/338 |
| 2016/0269185 A1* | 9/2016 | Stojanovski | H04W 8/005 |
| 2016/0285539 A1* | 9/2016 | Sadiq | H04B 7/15507 |
| 2016/0302249 A1 | 10/2016 | Sheng | |
| 2016/0338095 A1* | 11/2016 | Faurie | H04W 72/1278 |
| 2016/0373257 A1* | 12/2016 | Adrangi | H04L 9/006 |
| 2016/0374051 A1* | 12/2016 | Morita | H04W 72/02 |
| 2017/0013653 A1* | 1/2017 | Suzuki | H04B 7/2606 |
| 2017/0019937 A1* | 1/2017 | Kim | H04W 76/14 |
| 2017/0041902 A1* | 2/2017 | Sheng | H04W 76/36 |
| 2017/0181064 A1* | 6/2017 | Lee | H04W 76/14 |
| 2017/0188404 A1* | 6/2017 | Fodor | H04W 76/14 |
| 2017/0202042 A1* | 7/2017 | Gao | H04W 76/14 |
| 2017/0231023 A1* | 8/2017 | Adachi | H04L 69/40 |
| 2017/0257192 A1* | 9/2017 | Wang | H04W 76/14 |
| 2017/0273055 A1* | 9/2017 | Xu | H04W 76/14 |
| 2017/0367087 A1* | 12/2017 | Seo | H04W 72/048 |
| 2018/0035448 A1* | 2/2018 | Gupta | H04W 72/1263 |
| 2018/0070252 A1* | 3/2018 | Gupta | H04W 74/0808 |
| 2018/0098370 A1* | 4/2018 | Bangolae | H04W 88/04 |
| 2018/0139694 A1* | 5/2018 | Folke | H04W 76/14 |
| 2018/0213577 A1* | 7/2018 | Burbidge | H04W 76/10 |
| 2018/0234827 A1* | 8/2018 | Stojanovski | H04L 63/061 |
| 2018/0234862 A1* | 8/2018 | Lee | H04W 88/04 |
| 2018/0249516 A1* | 8/2018 | Jung | H04W 76/10 |
| 2018/0279120 A1* | 9/2018 | Lehtovirta | H04L 63/061 |
| 2019/0021123 A1* | 1/2019 | Ma | H04W 12/02 |
| 2019/0053305 A1* | 2/2019 | Saiwai | H04L 5/0053 |
| 2019/0075430 A1* | 3/2019 | Lincoln | H04W 24/10 |
| 2019/0110325 A1* | 4/2019 | Gulati | H04L 5/0032 |
| 2019/0124572 A1* | 4/2019 | Park | H04W 36/0088 |
| 2019/0132401 A1* | 5/2019 | Cho | H04W 4/12 |
| 2019/0182890 A1* | 6/2019 | Jeong | H04W 76/27 |
| 2019/0223008 A1* | 7/2019 | Vanderveen | H04L 9/0825 |
| 2019/0239112 A1* | 8/2019 | Rao | H04W 28/06 |
| 2019/0306251 A1* | 10/2019 | Talebi Fard | H04W 76/10 |
| 2019/0335332 A1* | 10/2019 | Ying | H04W 40/22 |
| 2019/0349951 A1* | 11/2019 | Ahmad | H04W 76/18 |
| 2019/0357285 A1* | 11/2019 | Jung | H04W 76/10 |
| 2019/0364424 A1* | 11/2019 | Vanderveen | H04W 4/40 |
| 2019/0364588 A1* | 11/2019 | Lu | H04W 88/08 |
| 2020/0059915 A1* | 2/2020 | Lee | H04W 72/0406 |
| 2020/0077327 A1* | 3/2020 | Duan | H04W 48/16 |
| 2020/0092685 A1* | 3/2020 | Fehrenbach | H04W 4/46 |
| 2020/0092692 A1* | 3/2020 | Wang | H04W 76/14 |
| 2020/0100119 A1* | 3/2020 | Byun | H04W 16/28 |
| 2020/0107381 A1* | 4/2020 | Ahmad | H04W 52/0212 |
| 2020/0178221 A1* | 6/2020 | Byun | H04W 72/046 |
| 2020/0221467 A1* | 7/2020 | Huang | H04W 72/0453 |
| 2020/0252909 A1* | 8/2020 | Yu | H04W 72/042 |
| 2020/0296745 A1* | 9/2020 | Inokuchi | H04W 72/1268 |
| 2020/0305176 A1* | 9/2020 | Hu | H04B 7/0456 |
| 2021/0243837 A1* | 8/2021 | Jung | H04W 8/24 |
| 2021/0297842 A1* | 9/2021 | Shrivastava | H04W 4/70 |
| 2022/0078839 A1* | 3/2022 | Yoshioka | H04W 72/1294 |

* cited by examiner

FIG. 2
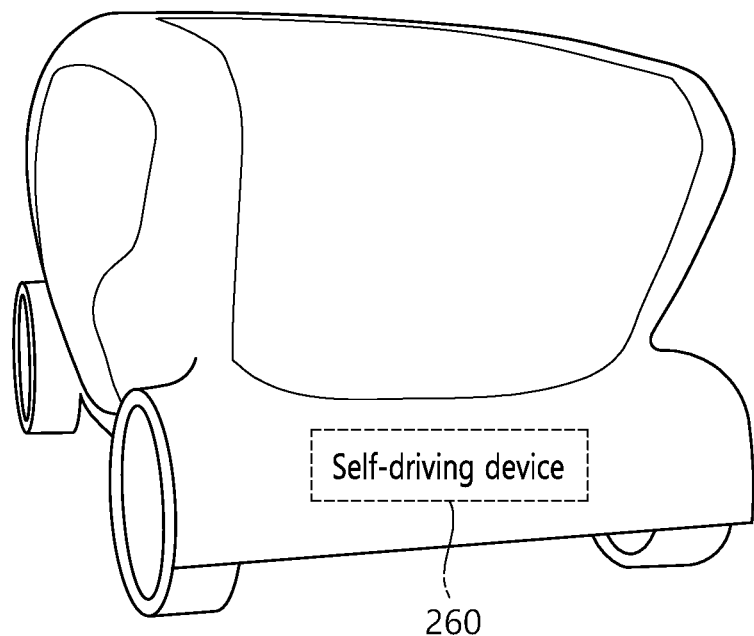
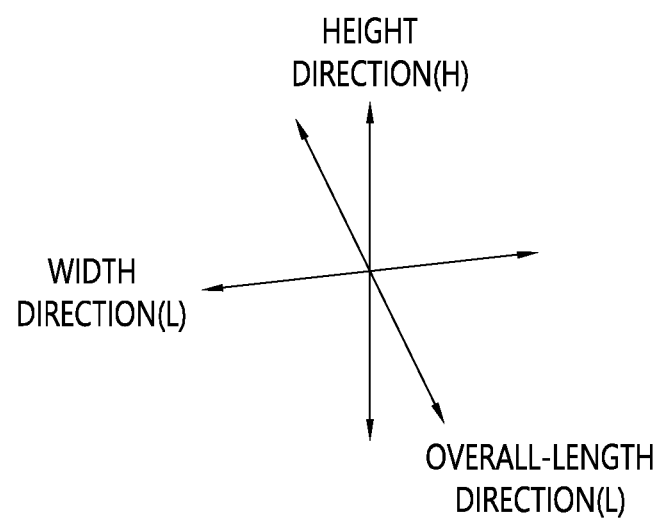

FIG. 12
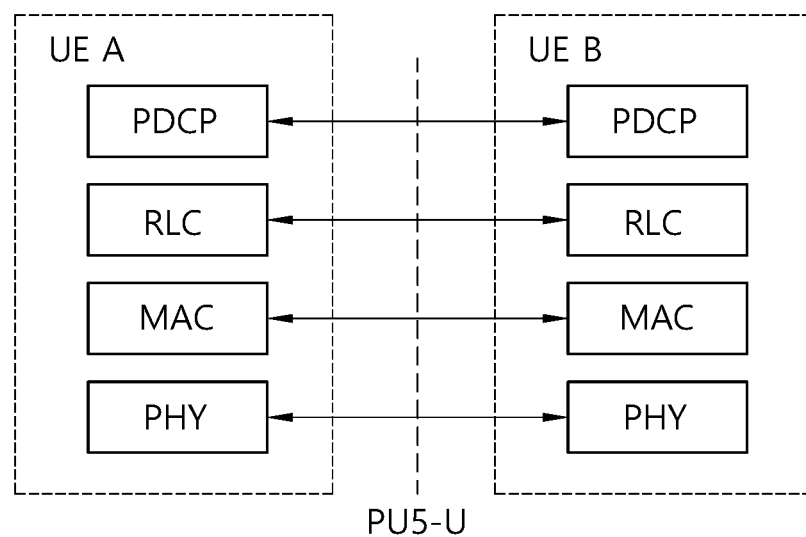
(a)
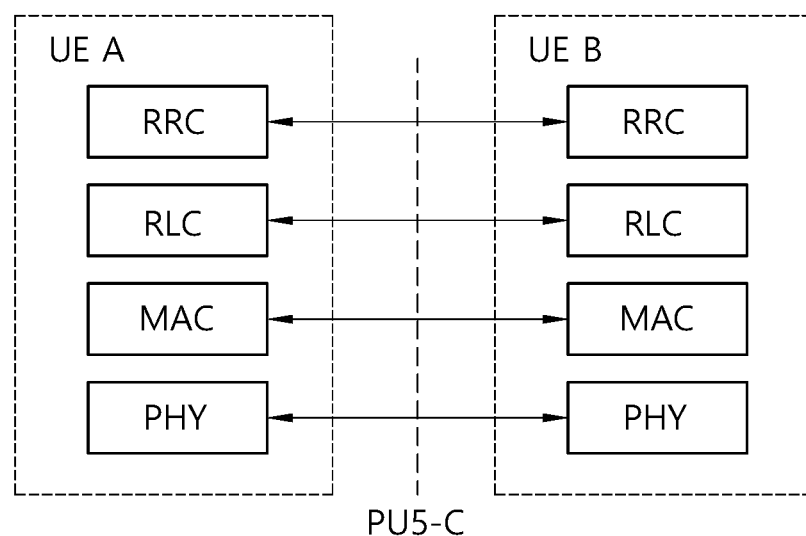
(b)

FIG. 13
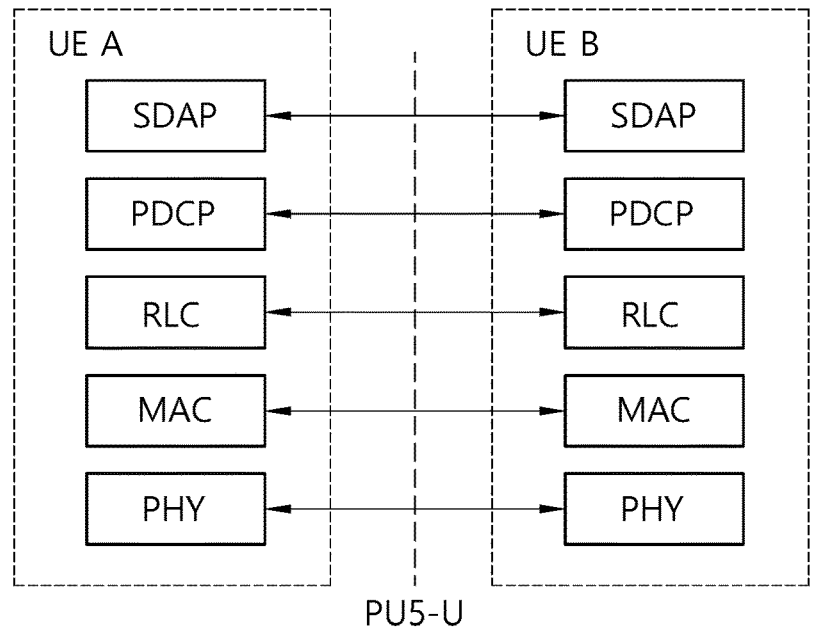
(a)
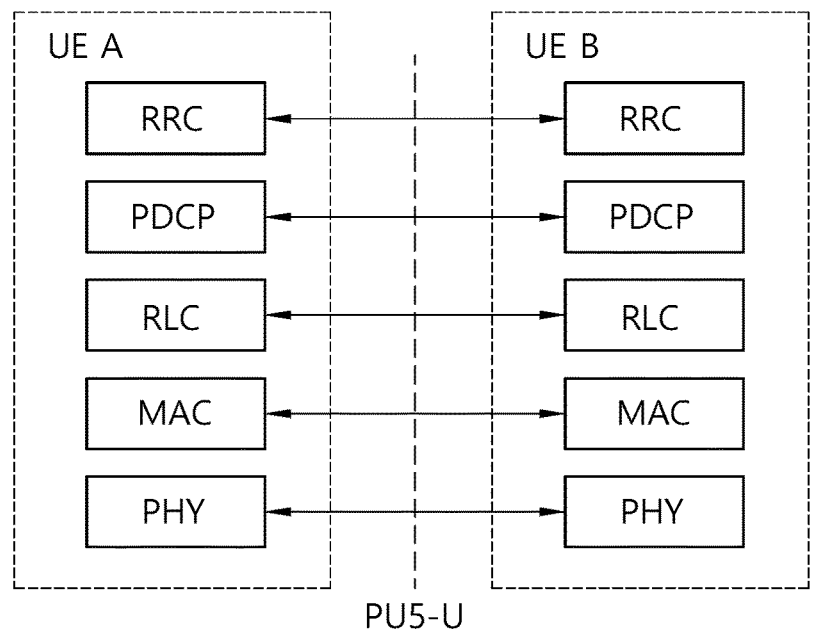
(b)

METHOD AND APPARATUS FOR PERFORMING SIDELINK COMMUNICATION BY UE IN NR V2X

CROSS-REFERENCE TO RELATED APPLICATIONS

This application is the National Stage filing under 35 U.S.C. 371 of International Application No. PCT/KR2019/007229, filed on Jun. 14, 2019, which claims the benefit of earlier filing date and right of priority to Korean Application No. 10-2018-0067840, filed on Jun. 14, 2018, the contents of which are all hereby incorporated by reference herein in their entirety.

BACKGROUND OF THE DISCLOSURE

Field of the Disclosure

The present invention relates to a wireless communication system, and more particularly, to a method for performing sidelink communication or V2X communication and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

FIG. 1 shows examples of 5G usage scenarios to which the technical features of the present invention can be applied. The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g.

devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

SUMMARY OF THE DISCLOSURE

Meanwhile, different services typically have different service requirements including different level of QoS as well as functional requirements. For this reason, when a UE wants to establish a direct connection with other UE for a certain service, it should be able to determine whether the direct connection between this direct link can fulfil the required service requirement and thus be able to perform a sort of admission control for the requested service.

However, current mechanism of device-to-device communication cannot support such functionality.

One embodiment provides a method for performing sidelink communication by a first apparatus. The method may include: receiving, from a second apparatus (9020), restriction information related to the sidelink communication between the first apparatus (9010) and the second apparatus (9020); and performing the sidelink communication with the second apparatus (9020) based on the restriction information.

Another embodiment provides a first apparatus (9010) performing sidelink communication. The first apparatus (9010) may include: at least one transceiver; at least one processor; and at least one computer memory operably connectable to the at least one processor and storing instructions that, when executed, cause the at least one processor to perform operations comprising: receiving, from a second apparatus (9020), restriction information related to the sidelink communication between the first apparatus (9010) and the second apparatus (9020); and performing the sidelink communication with the second apparatus (9020) based on the restriction information.

A sidelink communication can be performed efficiently between apparatus.

BRIEF DESCRIPTION OF THE DRAWINGS

FIG. 2 shows a vehicle to which an exemplary embodiment of the present invention can be applied.

FIG. 12 shows a protocol stack for a sidelink communication to which the exemplary embodiment of the present invention can be applied.

FIG. 13 shows a protocol stack for a sidelink communication to which the exemplary embodiment of the present invention can be applied.

DESCRIPTION OF EXEMPLARY EMBODIMENTS

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Hereinafter, a vehicle to which the exemplary embodiment of the present invention can be applied will be described in detail.

FIG. 2 shows a vehicle to which an exemplary embodiment of the present invention can be applied.

Referring to FIG. 2, a vehicle (100) to which the present invention can be applied is defined as a transport means that runs (or drives) on a road or rail. The vehicle (100) corresponds to a concept including automobiles, trains, and motorcycles. The vehicle (100) may correspond to a concept that includes all of an internal combustion engine (ICE) vehicle being equipped with an engine as its power source, a hybrid vehicle being equipped with an engine and an electric motor as its power source, an electric vehicle being equipped with an electric motor as its power source, and so on. The vehicle (100) may correspond to a personally owned vehicle (POV). The vehicle (100) may also correspond to a shared vehicle. And, the vehicle (100) may correspond to an autonomous (or self-driving) vehicle.

Figure 1:
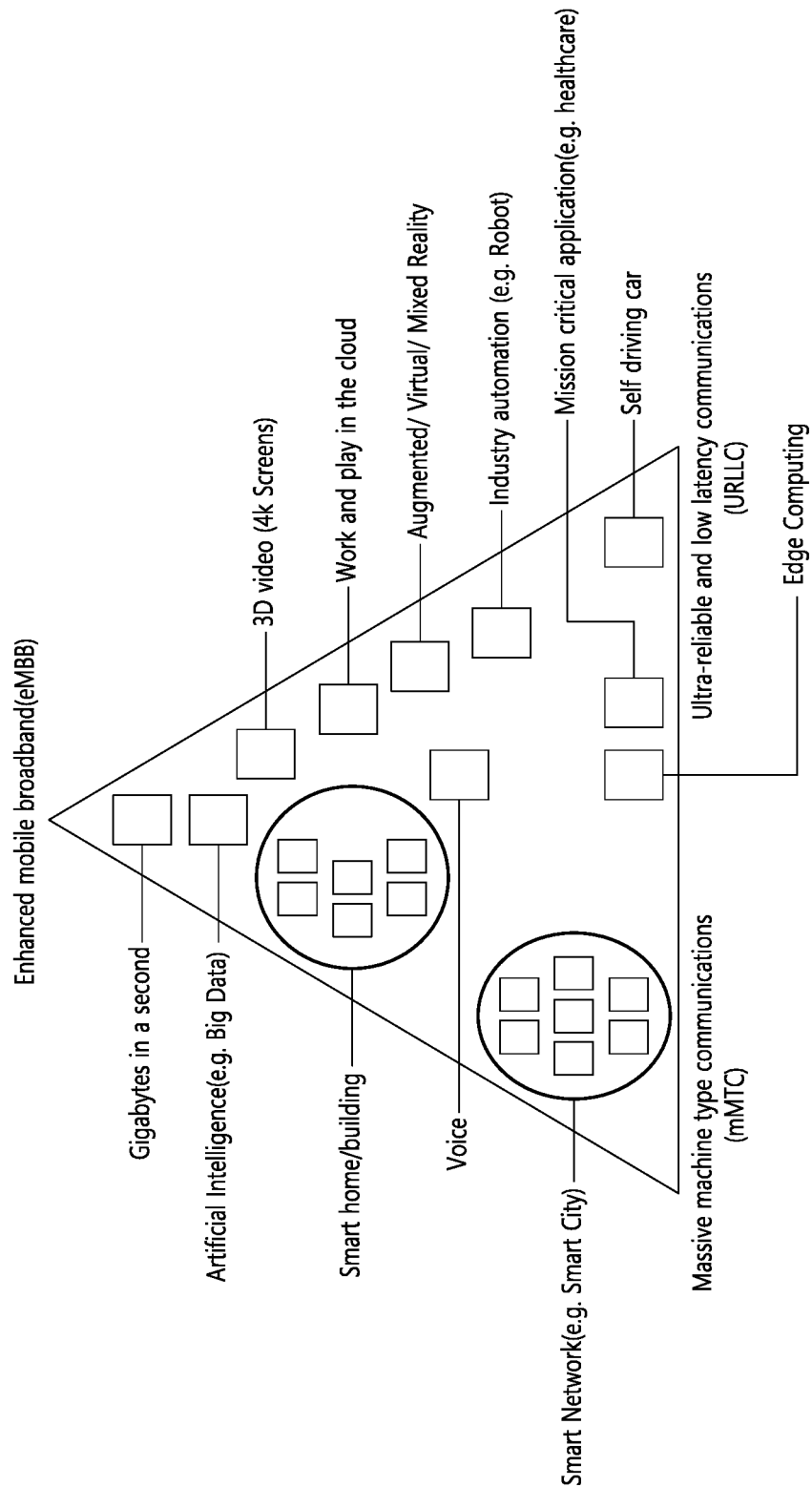
FIG. 1 shows examples of 5G usage scenarios to which the technical features of the present invention can be applied.
Figure 3:
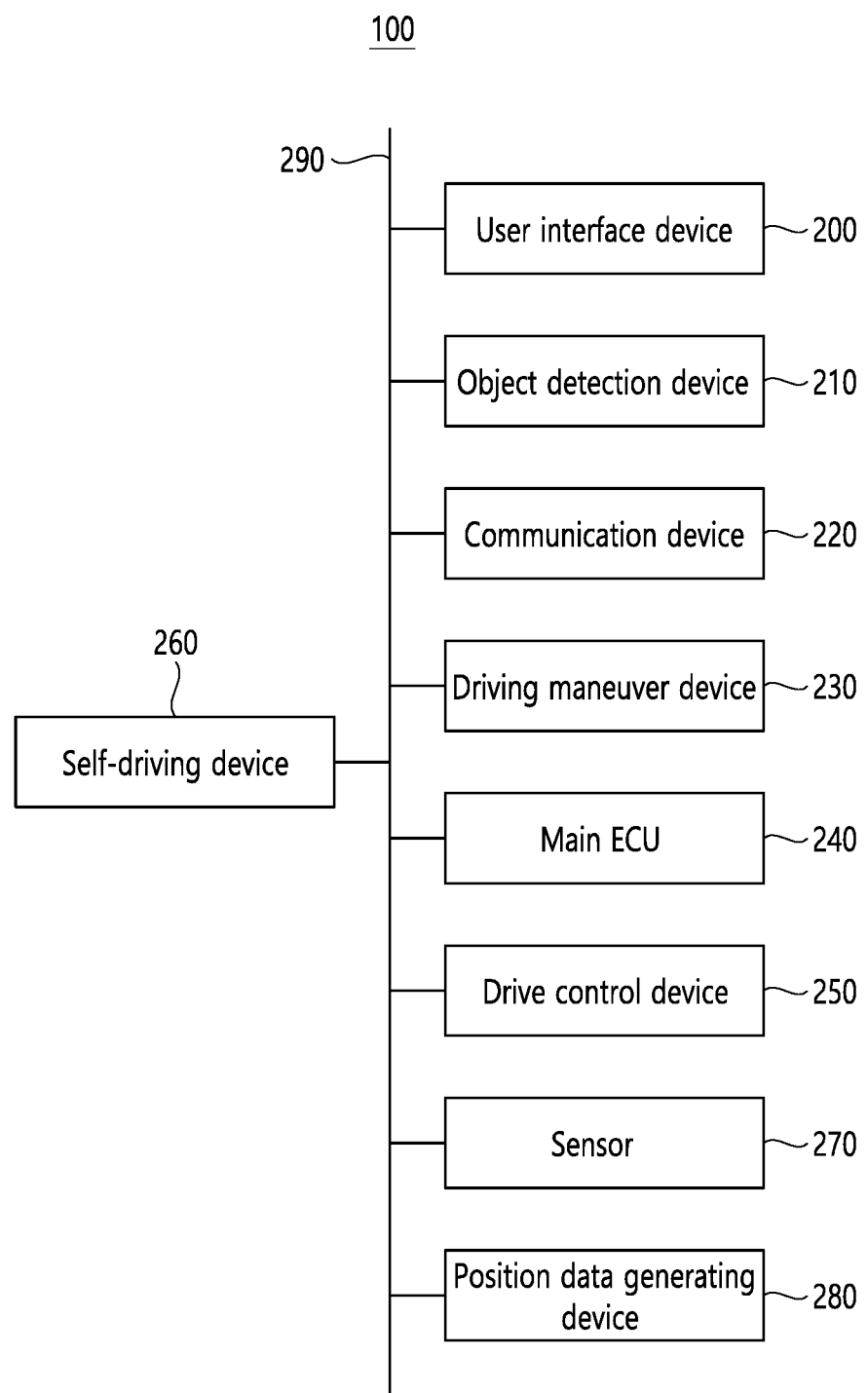
FIG. 3 shows a control block diagram of a vehicle according to an exemplary embodiment of the present invention.

FIG. 3 shows a control block diagram of a vehicle according to an exemplary embodiment of the present invention.

Referring to FIG. 3, the vehicle (100) may include a user interface device (200), an object detection device (210), a communication device (220), a driving maneuver device (230), a main ECU (240), a drive control device (250), a self-driving device (260), a sensor (270), and a position data generating device (280). The object detection device (210), the communication device (220), the driving maneuver device (230), the main ECU (240), the drive control device (250), the self-driving device (260), the sensor (270), and the position data generating device (280) may each generate an electrical signal and may collectively embody an electrical device exchanging electrical signals between each block.

1) User interface device

The user interface device (200) corresponds to a device being configured for a communication between the vehicle (100) and the user. The user interface device (200) may receive user input and may provide information generated from the vehicle (100) to the user. The vehicle (100) may implement a User Interface (UI) or User Experience (UX) via the user interface device (200). The user interface device (200) may include an input device, an output device, and a user monitoring device.

2) Object detection device

The object detection device (210) may generate information on an object being positioned outside of the vehicle (100). The information on an object may include at least any one of information on the presence or absence of an object, position information of the object, information on a distance between the vehicle (100) and the object, and information on a relative velocity between the vehicle (100) and the object. The object detection device (210) may detect an object being positioned outside of the vehicle (100). The object detection device (210) may include at least one sensor capable of detecting an object being positioned outside of the vehicle (100). The object detection device (210) may include at least any one of a camera, a radar, a lidar, an ultrasonic sensor, and an infrared sensor. The object detection device (210) may provide the object-related data generated based on a sensing signal, which is generated from a sensor, to at least one of the electronic devices included in the vehicle.

2.1) Camera

The camera may generate information on an object being positioned outside of the vehicle (100) by using an image. The camera may include at least one lens, at least one image sensor, and at least on processor being electrically connected to the at least one image sensor so as to process received signals and generating data related to the object based on the processed signals.

The camera may correspond to at least any one of a mono camera, a stereo camera, and an Around View Monitoring (AVM) camera. The camera may acquire position information of an object, information on a distance between the camera and the object or information on a relative velocity between the camera and the object, by using diverse image processing algorithms. For example, the camera may acquire the information on the distance and relative velocity between the camera and the object, from the acquired image, based on a change in object size in accordance with time. For example, the camera may acquire the information on the distance and relative velocity between the camera and the object via pinhole model, road profiling, and so on. For example, the camera may acquire the information on the distance and relative velocity between the camera and the object from a stereo image, which is acquired from the stereo camera, based on disparity information.

In order to capture the exterior of the vehicle, the camera may be mounted at a position of the vehicle from which a field of view (FOV) can be ensured. In order to capture a front area of the vehicle, the camera may be installed near a front windshield inside the vehicle. The camera may be installed near a front bumper or radiator grill. In order to capture a back area of the vehicle, the camera may be installed near a rear glass inside the vehicle. The camera may be installed near a rear bumper, a trunk, or tail gate. In order to capture a side area of the vehicle, the camera may be installed near at least any one side window inside the vehicle. Alternatively, the camera may be installed near a side mirror, a fender, or a door.

2.2) Radar

The radar may generate information on an object being positioned outside of the vehicle (100) by using radio waves. The radar may include a radio wave transmitter, a radio wave receiver, and at least one processor being electrically connected to the radio wave transmitter and the radio wave receiver so as to process received signals and generating data on the object based on the processed signals. The radar may be implemented as a pulse radar or a continuous-wave radar. Herein, the continuous-wave radar may be implemented as a Frequency Modulated Continuous Wave (FMCW) radar or a Frequency Shift Keying (FSK) radar. The radar may detect an object based on a Time of Flight (TOF) method or a phase-shift method by using radio waves and may then detect a position of the detected object, and a distance and relative velocity between the radar and the detected object. The radar may be adequately installed on the outside of the vehicle in order to detect an object, which is positioned in front of the vehicle, behind the vehicle, or at the side of the vehicle.

2.3) Lidar

The lidar may generate information on an object being positioned outside of the vehicle (100) by using laser light. The lidar may include a light transmitter, a light receiver, and at least one processor being electrically connected to the light transmitter and the light receiver so as to process received signals and generating data on the object based on the processed signals. The lidar may be implemented by using a Time of Flight (TOF) method or a phase-shift method. The lidar may be implemented as an operational lidar or a non-operational lidar. In case the lidar is implemented as the operational type, the lidar is rotated by a motor and may detect any object in the surroundings of the vehicle (100). In case the lidar is implemented as the non-operational type, the lidar may detect objects being located within a predetermined range from the vehicle (100) via optical steering. The vehicle (100) may include a plurality of non-operational lidars. The lidar may detect an object based on a Time of Flight (TOF) method or a phase-shift method by using laser light and may then detect a position of the detected object, and a distance and relative velocity between the lidar and the detected object. The lidar may be adequately installed on the outside of the vehicle in order to detect an object, which is positioned in front of the vehicle, behind the vehicle, or at the side of the vehicle.

3) Communication device

The communication device (220) may wirelessly exchanges signals with a device located outside of the vehicle (100). The communication device (220) may exchange signals with an external device through a network or may directly exchange signals with an external device. An external device may include at least any one of a server, a mobile equipment (or device), and another vehicle. For example, the communication device (220) may exchange signals with at least one user equipment (UE). In order to perform communication, the communication device (220) may include at least any one of a radio frequency (RF) circuit and an RF device that can implement at least one communication protocol. According to the exemplary embodiment of the present invention, the communication device (220) may also use a plurality of communication protocols. The communication device (220) may shift communication protocols in accordance with its distance from a mobile equipment.

For example, the communication device may exchange signals with an external device based on a Cellular V2X (C-V2X) technology. For example, the C-V2X technology may include an LTE-based sidelink communication and/or an NR-based sidelink communication. Details on the C-V2X will be described later on.

For example, the communication device may exchange signals with an external device based on an IEEE 802.11p PHY/MAC layer technology and IEEE 1609 Network/Transport layer technology based Dedicated Short Range Communications (DSRC) technology or Wireless Access in Vehicular Environment (WAVE) specification. The DSRC (or WAVE specification) technology corresponds to a communication standard that has been devised to provide Intelligent Transport System (ITS) services via short range dedicated communication between on-board units or between a roadside unit and an on-board unit. The DSRC technology may use a 5.9 GHz band frequency and may perform communication having a data transmission rate of 3 Mbps-27 Mbps. The IEEE 802.11p technology may be combined with the IEEE 1609 technology so as to support the DSRC technology (or WAVE specification).

The communication device according to the present invention may exchange signals with an external device by using only any one of the C-V2X technology and the DSRC technology. Alternatively, the communication device according to the present invention may exchange signals with an external device by using a hybrid technology consisting of the C-V2X technology and the DSRC technology.

4) Driving maneuver device

The driving maneuver device (230) corresponds to a device receiving user input for driving. In case of a manual mode, the vehicle (100) may be operated based on signals being provided by the driving maneuver device (230). The driving maneuver device (230) may include a steering input device (e.g., steering wheel), an acceleration input device (e.g., accelerator pedal), and a brake input device (e.g., brake pedal).

5) Main ECU

The main ECU (240) may control overall operations of at least one electronic device being equipped in the vehicle (100).

6) Drive control device

The drive control device (250) corresponds to a device being configured to electrically control diverse types of vehicle driving devices within the vehicle (100). The drive control device (250) may include a powertrain drive control device, a chassis drive control device, a door/window drive control device, a safety unit drive control device, a lamp drive control unit, and a duct drive control device. The powertrain drive control device may include a power source drive control device and a transmission drive control device. The chassis drive control device may include a steering drive control device, a brake drive control device, and a suspension drive control device. The safety unit drive control device may include a safety belt (or seat belt) drive control device for controlling safety belts (or seat belts).

The drive control device (250) includes at least one electronic control device (e.g., Electronic Control Unit (ECU)).

The drive control device (250) may control the vehicle driving devices based on the signals received from the self-driving device (260). For example, the drive control device (250) may control the powertrain, the steering device, and the brake device based on the signals received from the self-driving device (260).

7) Self-driving device

The self-driving device (260) may generate a path for self-driving based on the acquired data. The self-driving device (260) may generate a driving plan in accordance with the generated path. The self-driving device (260) may generate a signal for controlling movements of the vehicle (100) according the driving place. The self-driving device (260) may provide the generated signals to the drive control device (250).

The self-driving device (260) may implement at least one Advanced Driver Assistance System (ADAS) function. The ADAS may implement at least any one of an Adaptive Cruise Control (ACC) system, an Autonomous Emergency Braking (AEB) system, a Forward Collision Warning (FCW) system, a Lane Keeping Assist (LKA) system, a Lane Change Assist (LCA) system, a Target Following Assist (TFA) system, a Blind Spot Detection (BSD) system, an adaptive High Beam Assist (HBA) system, an Auto Parking System (APS), a pedestrian (PD) collision warning system, a Traffic Sign Recognition (TSR) system, a Traffic Sign Assist (TSA) system, a Night Vision (NV) system, a Driver Status Monitoring (DSM) system, and a Traffic Jam Assist (TJA) system.

The self-driving device (260) may perform a shifting operation from the self-driving mode to the manual driving mode or a shifting operation from the manual driving mode or the self-driving mode. For example, the self-driving device (260) may shift the driving mode of the vehicle (100) from the self-driving mode to the manual mode or from the manual mode to the self-driving mode based on the signals received from the user interface device (200).

8) Sensor

The sensor (270) may sense the vehicle status. The sensor (270) may include at least any one of an inertial measurement unit (IMU) sensor, a collision sensor, a wheel sensor, a speed sensor, an inclination sensor, a weight detection sensor, a heading sensor, a position module, a vehicle forward/reverse sensor, a battery sensor, a fuel sensor, a tire sensor, a steering sensor, a temperature sensor, a humidity sensor, an ultrasonic sensor, an illuminance sensor, and a pedal position sensor. Meanwhile, the inertial measurement unit (IMU) sensor may include one or more of an acceleration sensor, a gyro sensor, and a magnetic sensor.

The sensor (270) may generate the vehicle status data based on the signals generated from at least one of the sensors. The vehicle status data may correspond to information being generated based on the data detected from diverse sensors equipped in the vehicle. The sensor (270) may generate data, such as vehicle stability data, vehicle motion data, vehicle yaw data, vehicle roll data, vehicle pitch data, vehicle collision data, vehicle direction data, vehicle angle data, vehicle speed data, vehicle acceleration data, vehicle inclination data, vehicle forward/reverse data, vehicle weight data, battery data, fuel data, tire air pressure data, vehicle indoor temperature data, vehicle indoor humidity data, steering wheel rotation angle data, vehicle outdoor illuminance data, data on pressure applied to the acceleration pedal, data on pressure applied to the brake pedal, and so on.

9) Position data generating device

The position data generating device (280) may generate position data of the vehicle (100). The position data generating device (280) may include at least any one of a Global Positioning System (GPS) and a Differential Global Positioning System (DGPS). The position data generating device (280) may generate the position data of the vehicle (100) based on signals being generated from at least any one of the GPS and the DGPS. According to an exemplary embodiment of the present invention, the position data generating device (280) may calibrate the position data based on at least any one of the Inertial Measurement Unit (IMU) of the sensor (270) and the camera of the object detection device (210). The position data generating device (280) may be referred to as a Global Navigation Satellite System (GNSS).

The vehicle (100) may include an internal communication system (290). A plurality of electronic devices being included in the vehicle (100) may exchange signals between one another by using the internal communication system (290). Data may be included in the corresponding signals. The internal communication system (290) may use at least one communication protocol (e.g., CAN, LIN, FlexRay, MOST, Ethernet).

Figure 4:
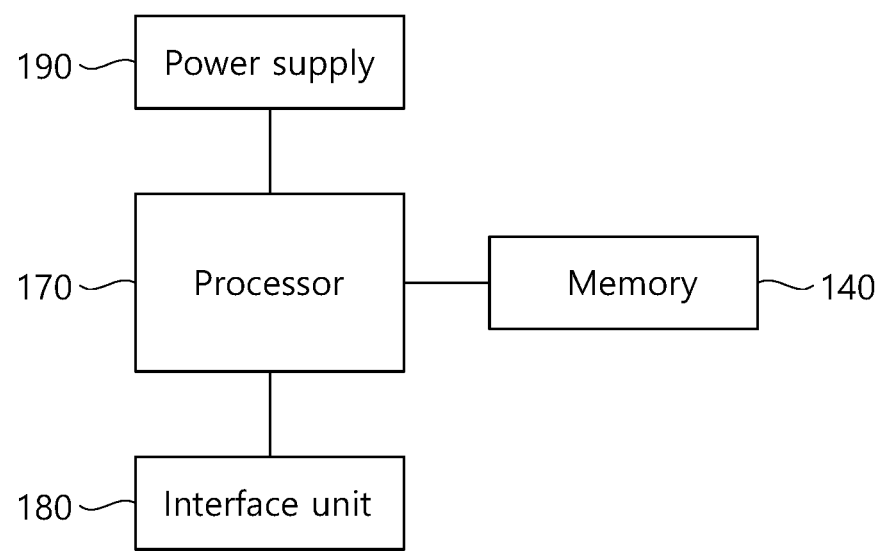
FIG. 4 shows a control block diagram of a self-driving device to which the exemplary embodiment of the present invention can be applied.

FIG. 4 shows a control block diagram of a self-driving device to which the exemplary embodiment of the present invention can be applied.

Referring to FIG. 4, the self-driving device (260) may include a memory (140), a processor (170), an interface unit (180), and a power supply (190).

The memory (140) is electrically connected to the processor (170). The memory (140) may store basic (or primary) data on a unit, control data for controlling operations of a unit, and data being inputted and outputted. The memory (140) may be configured in the form of hardware as at least any one of ROM, RAM, EPROM, flash drive, and hard drive. The memory (140) may store diverse data for the overall operations of the self-driving device (260), such as programs for processing or controlling the processor (170). The memory (140) may be implemented as a single body with the processor (170). According to the exemplary embodiment of the present invention, the memory (140) may be classified as a sub-structure of the processor (170).

The interface unit (180) may exchange signals with at least one electronic device being equipped in the vehicle (100) via wired or wireless connection. The interface unit (180) may exchange signals with at least one of the object detection device (210), the communication device (220), the driving maneuver device (230), the main ECU (240), the drive control device (250), the sensor (270), and the position data generating device (280) via wired or wireless connection. The interface unit (180) may be configured of any one of a communication module, a terminal, a pin, a cable, a port, a circuit, an element, and a device.

The power supply (190) may supply power to the self-driving device (260). The power supply (190) may be supplied with power from a power source (e.g., battery), which is included in the vehicle (100), and the power may then be supplied to each unit of the self-driving device (260). The power supply (190) may be operated in accordance with a control signal, which is provided by the main ECU (240). The power supply (190) may include a switched-mode power supply (SMPS).

The processor (170) may be electrically connected to the memory (140), the interface unit (180), and the power supply (190) and may exchange signals to and from one another. The processor (170) may be implemented by using at least one of application specific integrated circuits (ASICs), digital signal processors (DSPs), digital signal processing devices (DSPDs), programmable logic devices (PLDs), field programmable gate arrays (FPGAs), processors (FPGAs), controllers, micro-controllers, microprocessors, and electric units performing many other functions.

The processor (170) may be operated by power provided from the power supply (190). The processor (170) may receive data while being provided with power from the power supply (190), process data, generate signals, and provide the generated signals.

The processor (170) may receive information from another electronic device equipped in the vehicle (100) via the interface unit (180). The processor (170) may provide control signals to another electronic device equipped in the vehicle (100) via the interface unit (180).

The self-driving device (260) may include at least one printed circuit board (PCB). The memory (140), the interface unit (180), the power supply (190), and the processor (170) may be electrically connected to the printed circuit board (PCB).

Hereinafter, a communication technology to which an exemplary embodiment of the present invention is to be applied will be described in detail.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present invention will not be limited only to this.

Figure 5:
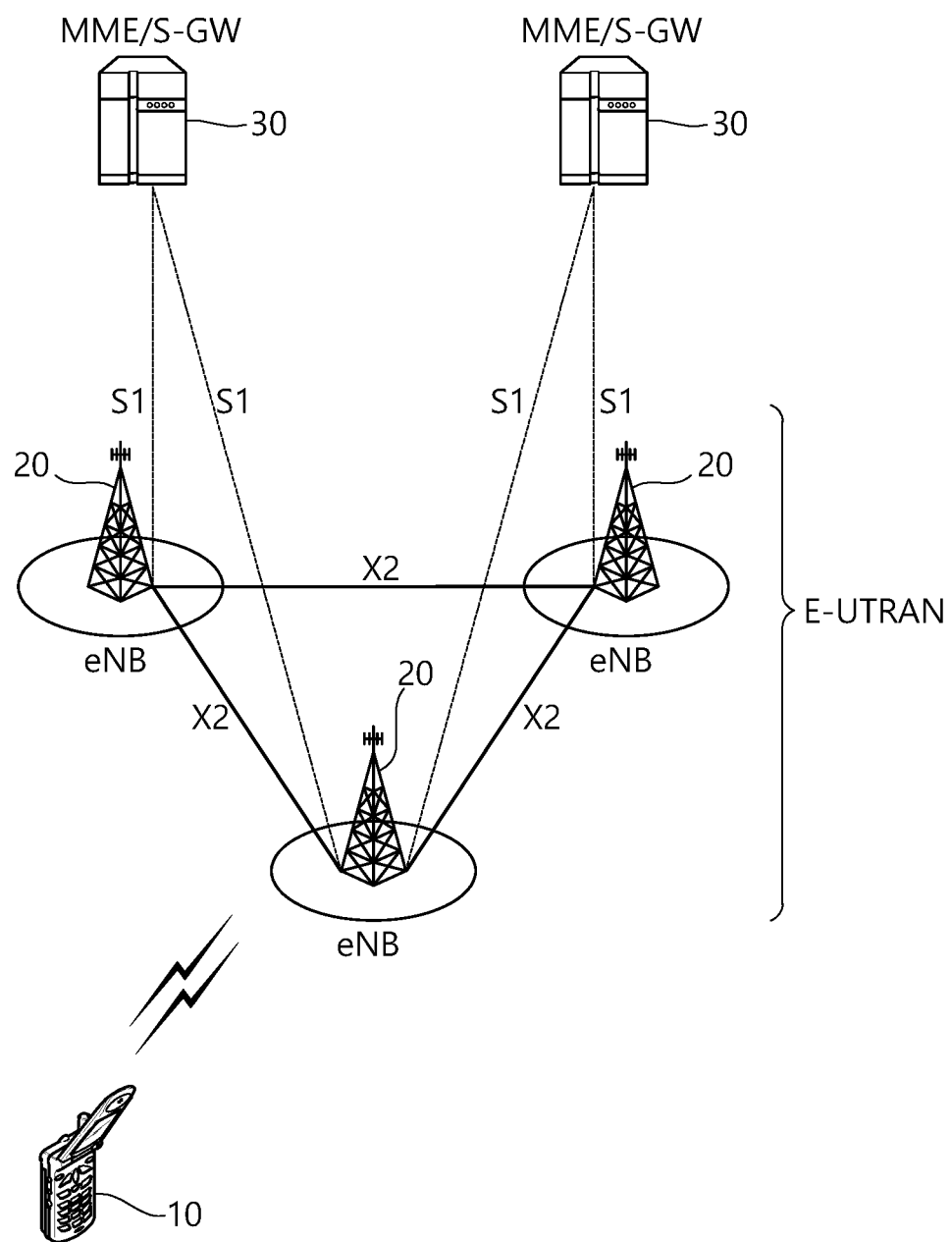
FIG. 5 shows a structure of an LTE system to which an exemplary embodiment of the present invention can be applied.

FIG. 5 shows a structure of an LTE system to which an exemplary embodiment of the present invention can be applied. This may also be referred to as an Evolved-UMTS Terrestrial Radio Access Network (E-UTRAN), or a Long Term Evolution (LTE)/LTE-A system.

Referring to FIG. 5, the E-UTRAN includes a base station (BS) (20), which provides a control plane and a user plane to a user equipment (UE) (10). The UE (10) may be fixed or mobile and may also be referred to by using different terms, such as Mobile Station (MS), User Terminal (UT), Subscriber Station (SS), Mobile Terminal (MT), wireless device, and so on. The base station (20) refers to a fixed station that communicated with the UE (10) and may also be referred to by using different terms, such as evolved-NodeB (eNB), Base Transceiver System (BTS), Access Point (AP), and so on.

The base stations (20) are interconnected to one another through an X2 interface. The base stations (20) are connected to an Evolved Packet Core (EPC) (30) through an S1 interface. More specifically, the base station (20) are connected to a Mobility Management Entity (MME) through an S1-MME interface and connected to Serving Gateway (S-GW) through an S1-U interface.

The EPC (30) is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a PDN as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 6:
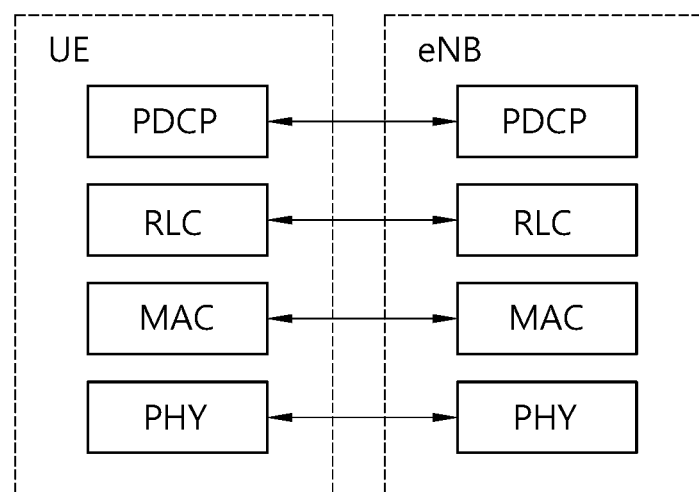
FIG. 6 shows a radio protocol architecture of a user plane to which an exemplary embodiment of the present invention can be applied.
Figure 7:
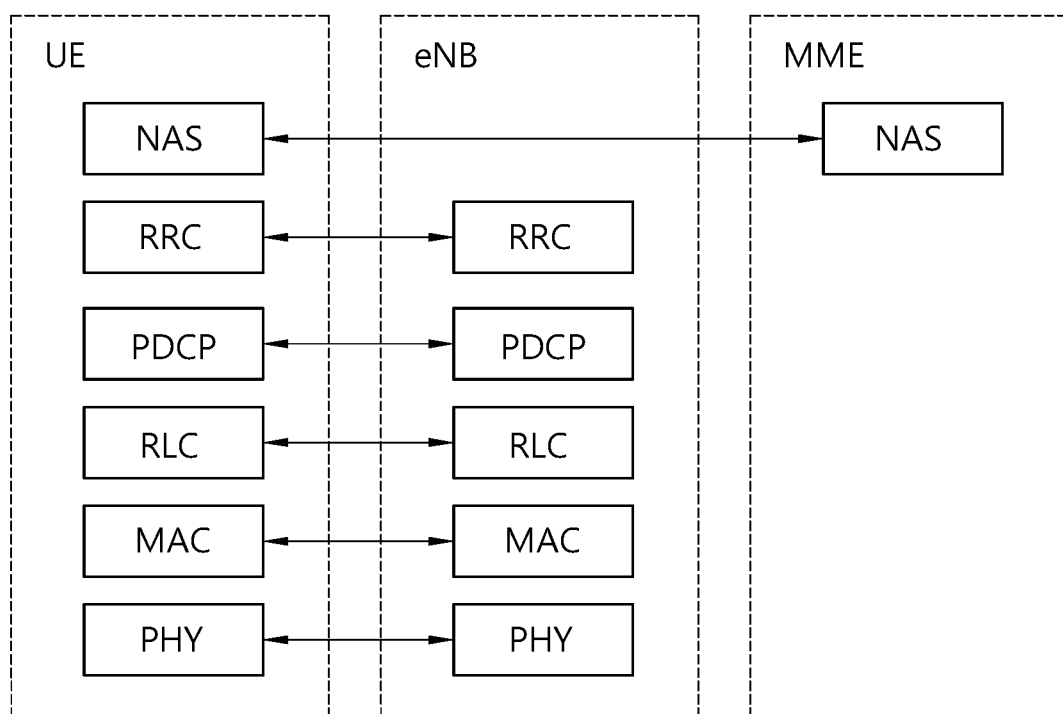
FIG. 7 shows a radio protocol architecture of a control plane to which an exemplary embodiment of the present invention can be applied.

FIG. 6 shows a radio protocol architecture of a user plane to which an exemplary embodiment of the present invention can be applied. FIG. 7 shows a radio protocol architecture of a control plane to which an exemplary embodiment of the present invention can be applied. The user plane corresponds to a protocol stack for user data transmission, and the control plane corresponds to a protocol stack for control signal transmission.

Referring to FIG. 6 and FIG. 7, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of RLC SDU. In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, PDCP layer) in order to transport data between the UE and the network.

Functions of a Packet Data Convergence Protocol (PDCP) in the user plane include transfer, header compression, and ciphering of user data. Functions of a Packet Data Convergence Protocol (PDCP) in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in a RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 8:
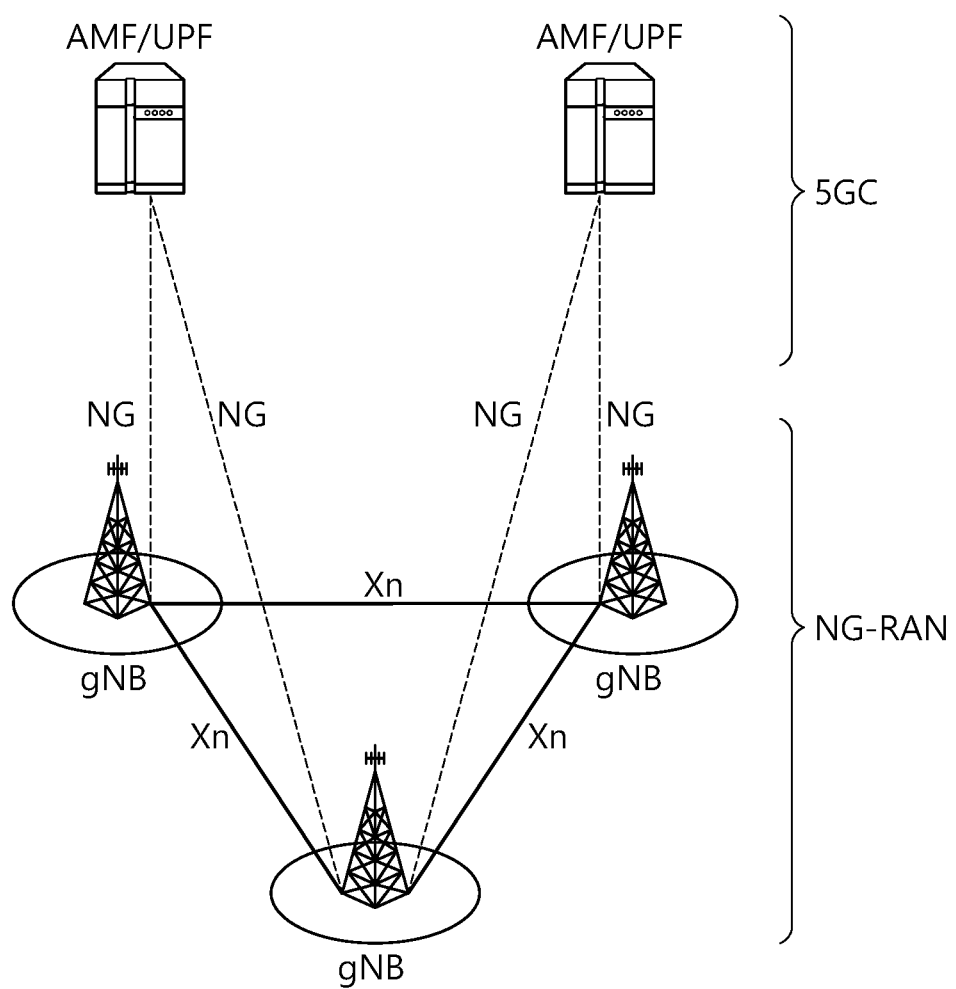
FIG. 8 shows a structure of an NR system to which an exemplary embodiment of the present invention can be applied.

FIG. 8 shows a structure of an NR system to which an exemplary embodiment of the present invention can be applied.

Referring to FIG. 8, an NG-RAN may include a gNB and/or eNB providing a user plane and control plane protocol termination to a user. FIG. 8 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 9:
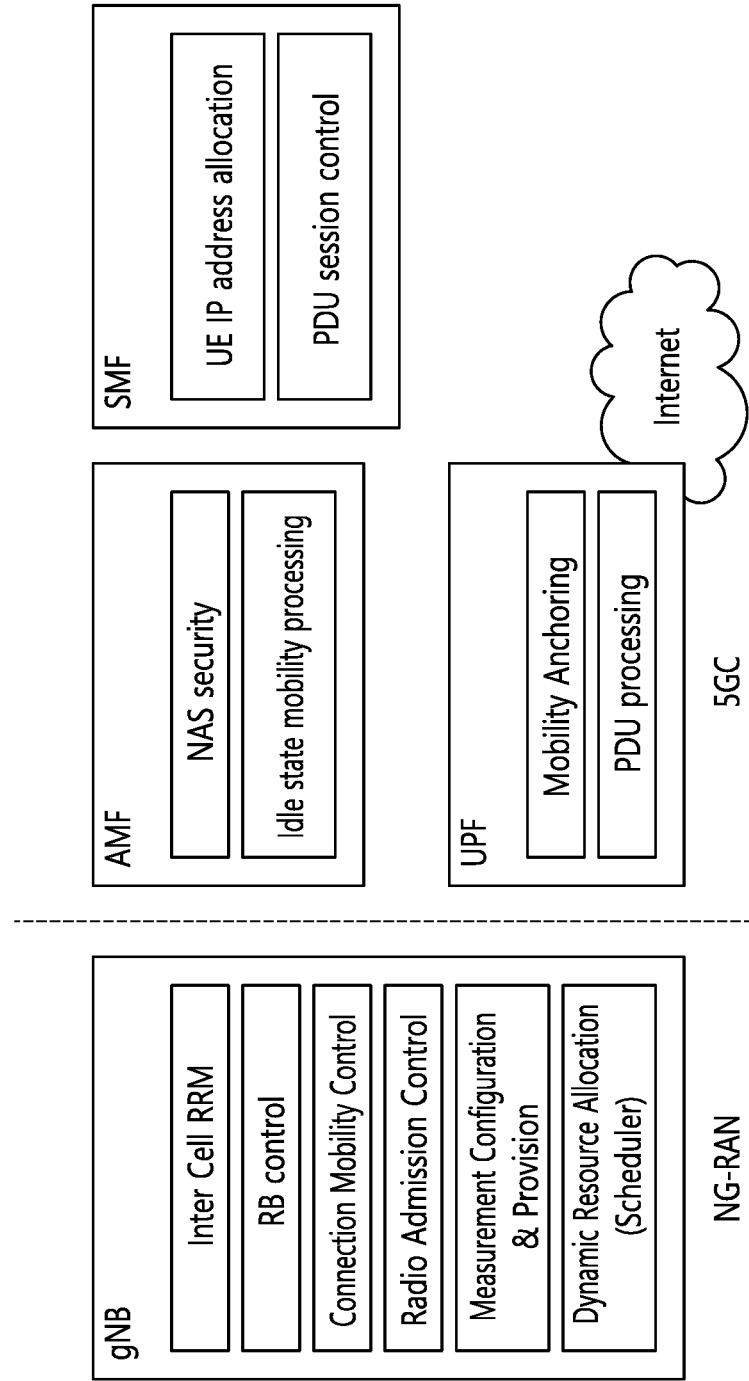
FIG. 9 shows a functional division between an NG-RAN and a 5GC to which an exemplary embodiment of the present invention can be applied.

FIG. 9 shows a functional division between an NG-RAN and a 5GC to which an exemplary embodiment of the present invention can be applied.

Referring to FIG. 9, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as NAS security, Idle state mobility processing, and so on. A UPF may provide functions, such as Mobility Anchoring, PDU processing, and so on. A Session Management Function (SMF) may provide functions, such as user equipment (UE) IP address allocation, PDU session control, and so on.

Figure 10:
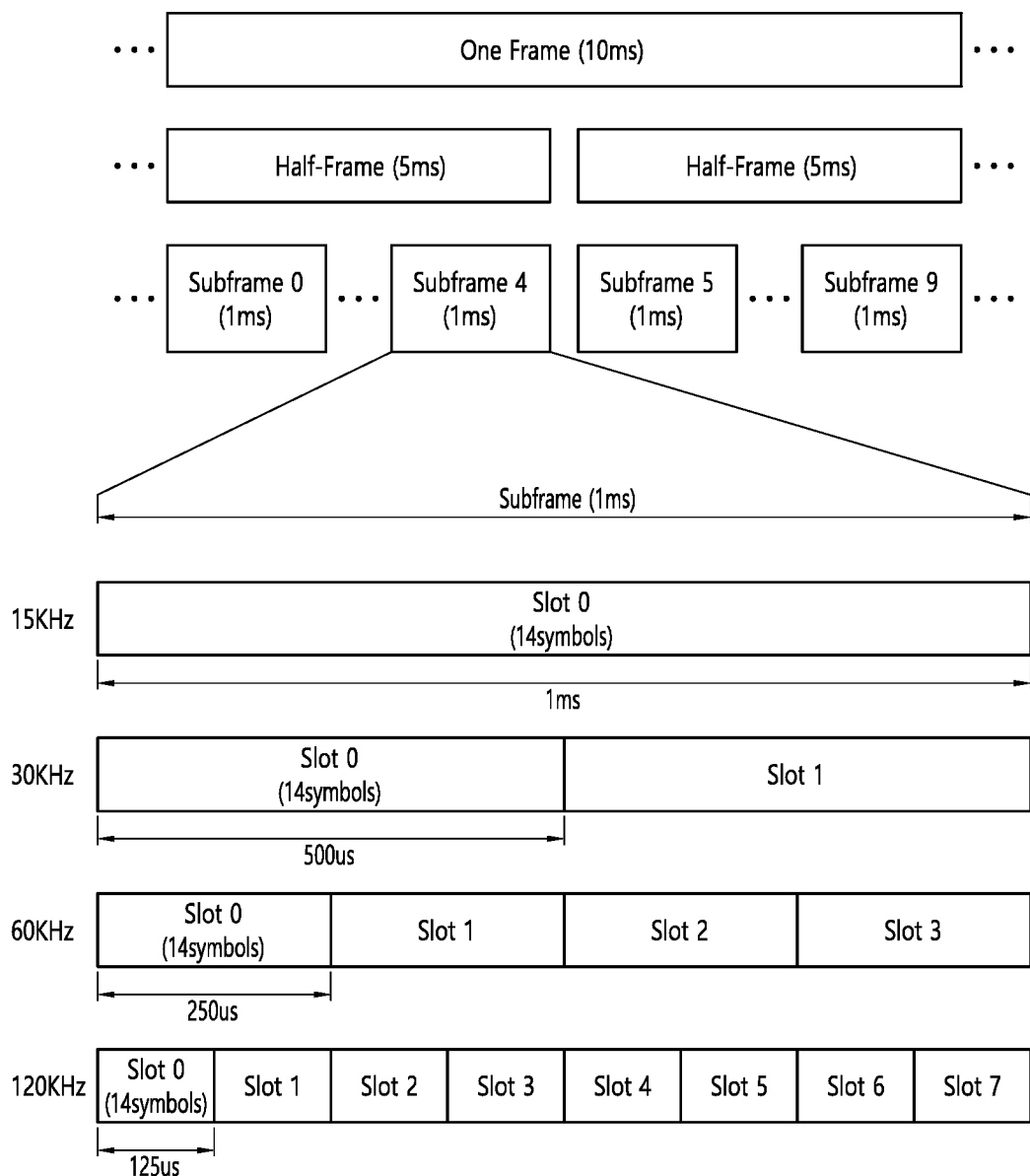
FIG. 10 shows a structure of a radio frame of an NR to which an exemplary embodiment of the present invention can be applied.

FIG. 10 shows a structure of a radio frame of an NR to which an exemplary embodiment of the present invention can be applied.

Referring to FIG. 10, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and an SC-FDMA symbol (or DFT-s-OFDM symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration ($\mu$), in a case where a normal CP is used.

TABLE 1

| SCS (15 * 2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

Figure 11:
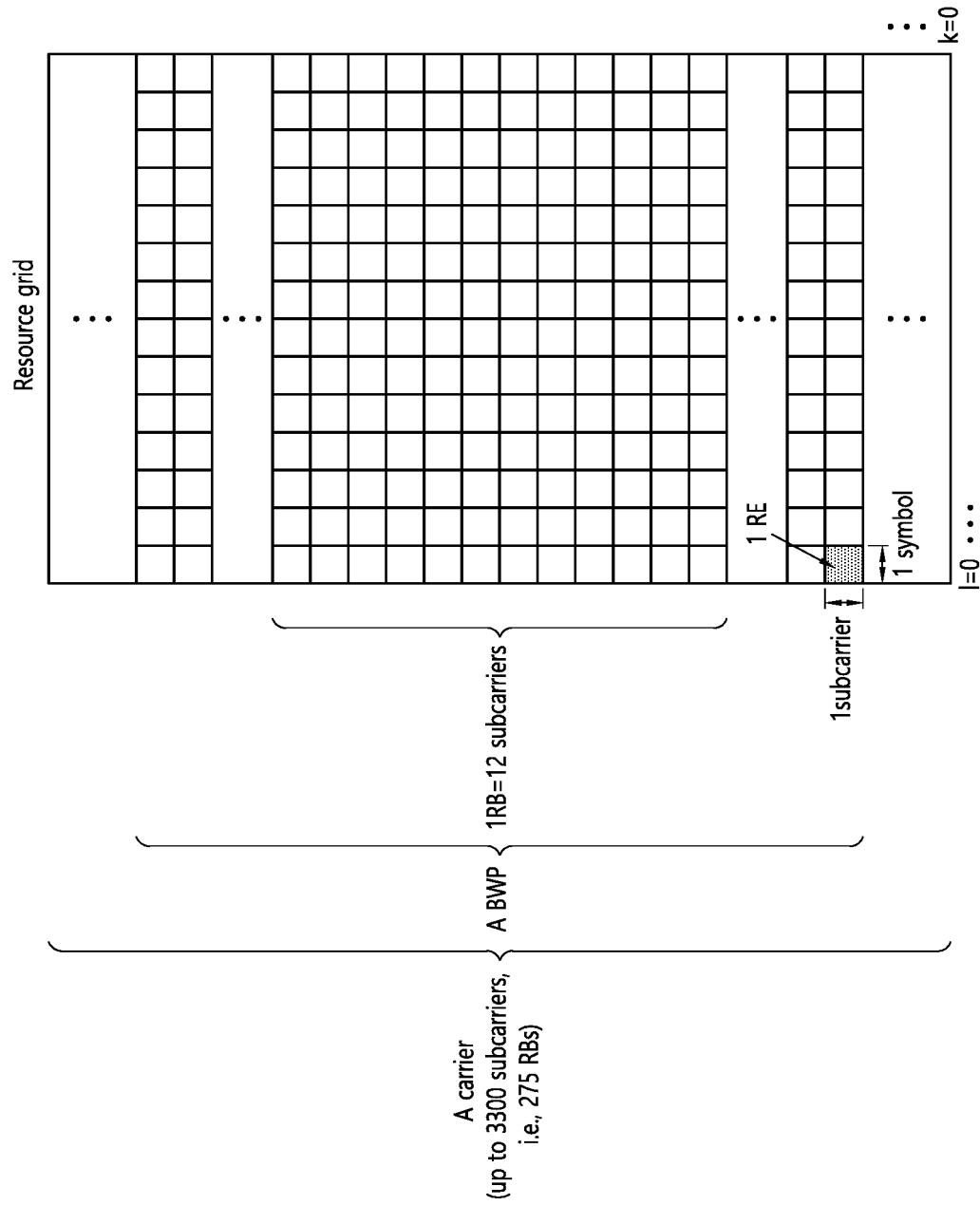
FIG. 11 shows a structure of a slot of an NR frame to which an exemplary embodiment of the present invention can be applied.

FIG. 11 shows a structure of a slot of an NR frame to which an exemplary embodiment of the present invention can be applied.

Referring to FIG. 11, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (P)RBs in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, V2X or sidelink communication will be described in detail.

FIG. 12 shows a protocol stack for a sidelink communication to which the exemplary embodiment of the present invention can be applied. More specifically, (a) of FIG. 12 represents a user plane protocol stack of LTE, and (b) of FIG. 12 represents a control plane protocol stack of LTE.

FIG. 13 shows a protocol stack for a sidelink communication to which the exemplary embodiment of the present invention can be applied. More specifically, (a) of FIG. 13 represents a user plane protocol stack of NR, and (b) of FIG. 13 represents a control plane protocol stack of NR.

Hereinafter, Sidelink Synchronization Signal (SLSS) and synchronization information will be described in detail.

SLSS corresponds to a sidelink specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may correspond to a (broadcast) channel through which basic (system) information that should first be known by the user equipment (UE) before transmitting and receiving sidelink signals. For example, the basic information may correspond to information related to SLSS, a Duplex mode (DM), TDD UL/DL configuration, information related to a resource pool, application types related to SLSS, a subframe offset, broadcast information, and so on.

The S-PSS, the S-SSS, and the PSBCH may be included in a block format (e.g., a sidelink SS/PSBCH block, hereinafter referred to as S-SSB). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL BWP. And, a frequency position of the S-SSB may be (pre-)configured. Therefore, the UE is not required to perform a hypothesis detection in order to discover the S-SSB in the carrier.

Each SLSS may have a physical layer sidelink synchronization identity (ID), and the respective value may be equal to any one value ranging from 0 to 335. Depending upon any one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer sidelink synchronization ID values, values 0 to 167 may correspond to value being used by a network, and values from 168 to 335 may correspond to value being used outside of the network coverage.

Figure 14:
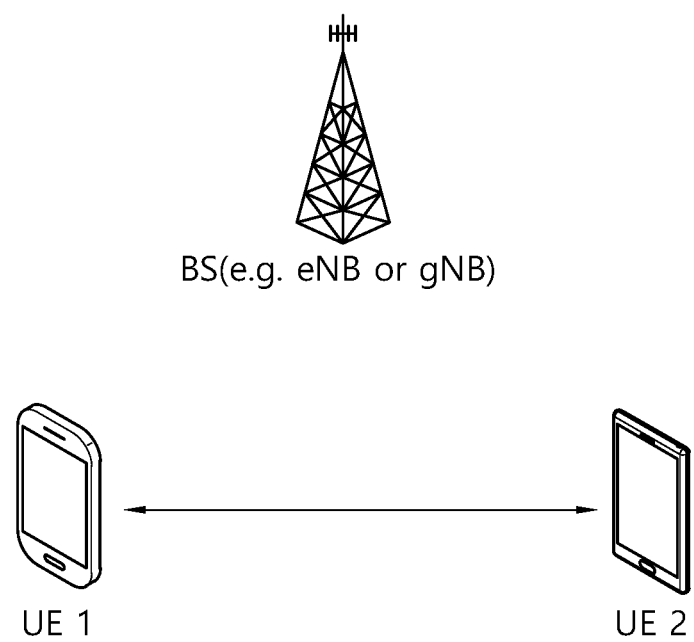
FIG. 14 shows a terminal performing V2X or sidelink communication to which an exemplary embodiment of the present invention can be applied.

FIG. 14 shows a terminal performing V2X or sidelink communication to which an exemplary embodiment of the present invention can be applied.

Referring to FIG. 14, in V2X/sidelink communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a sidelink signal by using the corresponding resource unit. User equipment 2 (UE2), which corresponds to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its sidelink signal transmission.

Figure 15:
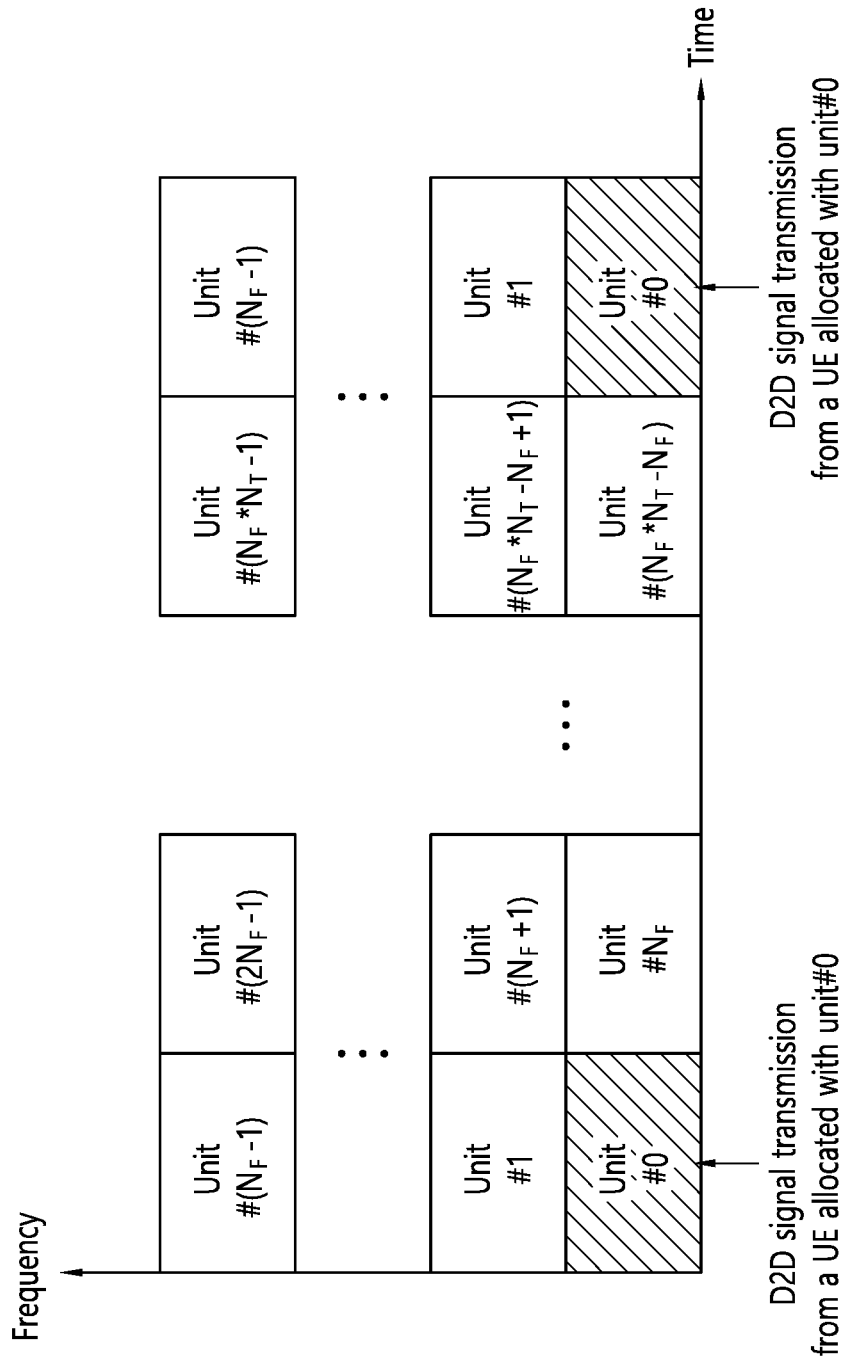
FIG. 15 shows an exemplary configuration of a resource unit to which an exemplary embodiment of the present invention can be applied.

FIG. 15 shows an exemplary configuration of a resource unit to which an exemplary embodiment of the present invention can be applied.

Referring to FIG. 15, the total frequency resources of the resource pool may be divided into NF number of resource units, the total time resources of the resource pool may be divided into NT number of resource units. Therefore, a total of NF*NT number of resource units may be defined in the resource pool. FIG. 15 shows an example of a case where the corresponding resource pool is repeated at a cycle of NT number of subframes.

As shown in FIG. 15, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit sidelink signals.

The resource pool may be segmented to multiple types. For example, depending upon the content of a sidelink signal being transmitted from each resource pool, the resource pool may be divided as described below.

(1) Scheduling Assignment (SA) may correspond to a signal including information, such as a position of a resource that is used for the transmission of a sidelink data channel, a Modulation and Coding Scheme (MCS) or MIMO transmission scheme needed for the modulation of other data channels, a Timing Advance (TA), and so on. The SA may also be multiplexed with sidelink data within the same resource unit and may then be transmitted, and, in this case, an SA resource pool may refer to a resource pool in which the SA is multiplexed with the sidelink data and then transmitted. The SA may also be referred to as a sidelink control channel.

(2) A Physical Sidelink Shared Channel (PSSCH) may correspond to a resource pool that is used by a transmitting UE for transmitting user data. If the SA is multiplexed with sidelink data within the same resource unit and then transmitted, only a sidelink data channel excluding the SA information may be transmitted from the resource pool that is configured for the sidelink data channel. In other words, REs that were used for transmitting SA information within a separate resource unit of the SA resource pool may still be used for transmitting sidelink data from the resource pool of a sidelink data channel.

(3) A discovery channel may correspond to a resource pool that is used by the transmitting UE for transmitting information, such as its own ID. By doing so, the transmitting UE may allow a neighboring UE to discover the transmitting UE.

Even if the content of the above-described sidelink signal is the same, different resource pools may be used depending upon the transmission/reception attribute of the sidelink signal. For example, even if the same sidelink data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each sidelink signal within a subframe or a number of subframes being used for the transmission of one sidelink signal) of the sidelink signal, signal intensity from the base station, a transmitting power intensity (or level) of a sidelink UE, and so on.

Hereinafter, resource allocation in a sidelink will be described in detail.

Figure 16:
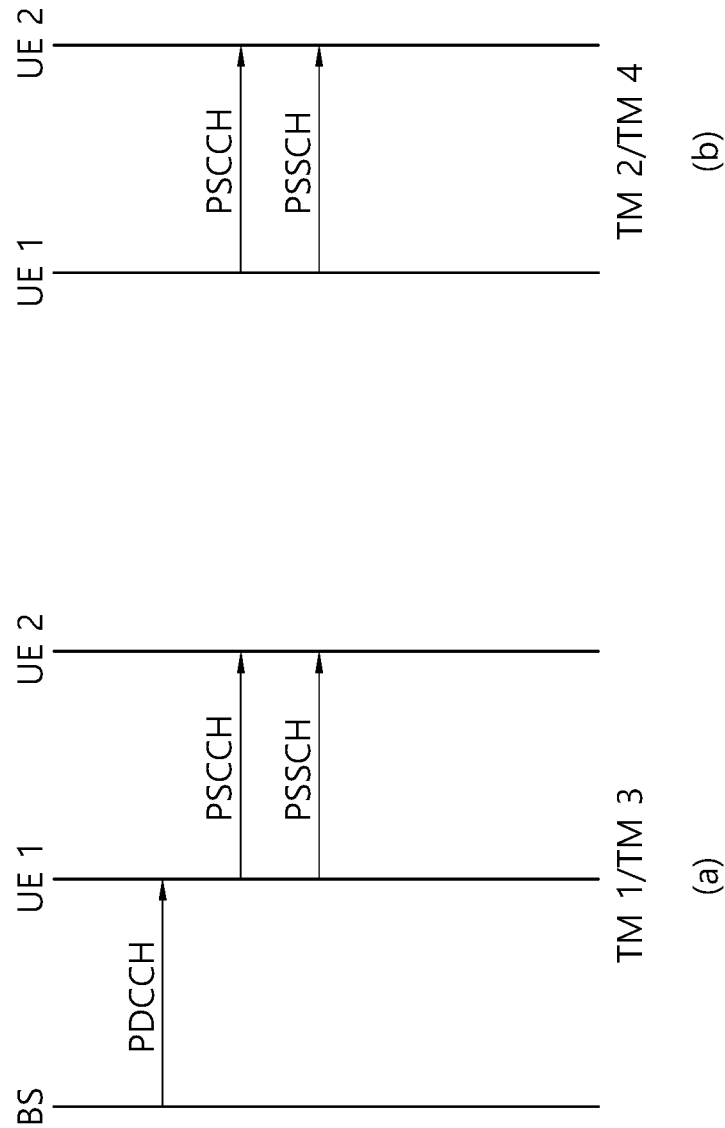
FIG. 16 shows user equipment (UE) operations according to a transmission mode (TM) being related to sidelink/V2X communication to which an exemplary embodiment of the present invention can be applied.

FIG. 16 shows user equipment (UE) operations according to a transmission mode (TM) being related to sidelink/V2X communication to which an exemplary embodiment of the present invention can be applied.

(a) of FIG. 16 represents UE operations being related to transmission mode 1 or transmission mode 3, and (b) of FIG. 16 represents UE operations being related to transmission mode 2 or transmission mode 4.

Referring to (a) of FIG. 16, in transmission modes 1/3, the base station performs resource scheduling to UE1 via PDCCH (more specifically, DCI), and UE1 performs sidelink/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE sidelink, transmission mode 1 may be applied to a general sidelink communication, and transmission mode 3 may be applied to a V2X sidelink communication.

Referring to (b) of FIG. 16, in transmission modes 2/4, the UE may schedule resources on its own. More specifically, in case of LTE sidelink, transmission mode 2 may be applied to a general sidelink communication, and the UE may select a resource from a predetermined resource pool on its own and may then perform sidelink operations. Transmission mode 4 may be applied to a V2X sidelink communication, and the UE may carry out a sensing/SA decoding procedure, and so on, and select a resource within a selection window on its own and may then perform V2X sidelink operations. After transmitting the SCI to UE2 via PSCCH, UE1 may transmit SCI-based data via PSSCH. Hereinafter, the transmission mode may be abbreviated to mode.

In case of NR sidelink, at least two types of sidelink resource allocation modes may be defined. In case of mode 1, the base station may schedule sidelink resources that are to be used for sidelink transmission. In case of mode 2, the user equipment (UE) may determine a sidelink transmission resource from sidelink resources that are configured by the base station/network or predetermined sidelink resources. The configured sidelink resources or the pre-determined sidelink resources may correspond to a resource pool. For example, in case of mode 2, the UE may autonomously select a sidelink resource for transmission. For example, in case of mode 2, the UE may assist (or help) sidelink resource selection of another UE. For example, in case of mode 2, the UE may be configured with an NR configured grant for sidelink transmission. For example, in case of mode 2, the UE may schedule sidelink transmission of another UE. And, mode 2 may at least support reservation of sidelink resources for blind retransmission.

Procedures related to sensing and resource (re-)selection may be supported in resource allocation mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL RSRP measurement, which is based on SL DMRS. The resource (re-)selection procedure may use a result of the sensing procedure in order to determine the resource for the sidelink transmission.

Figure 17:
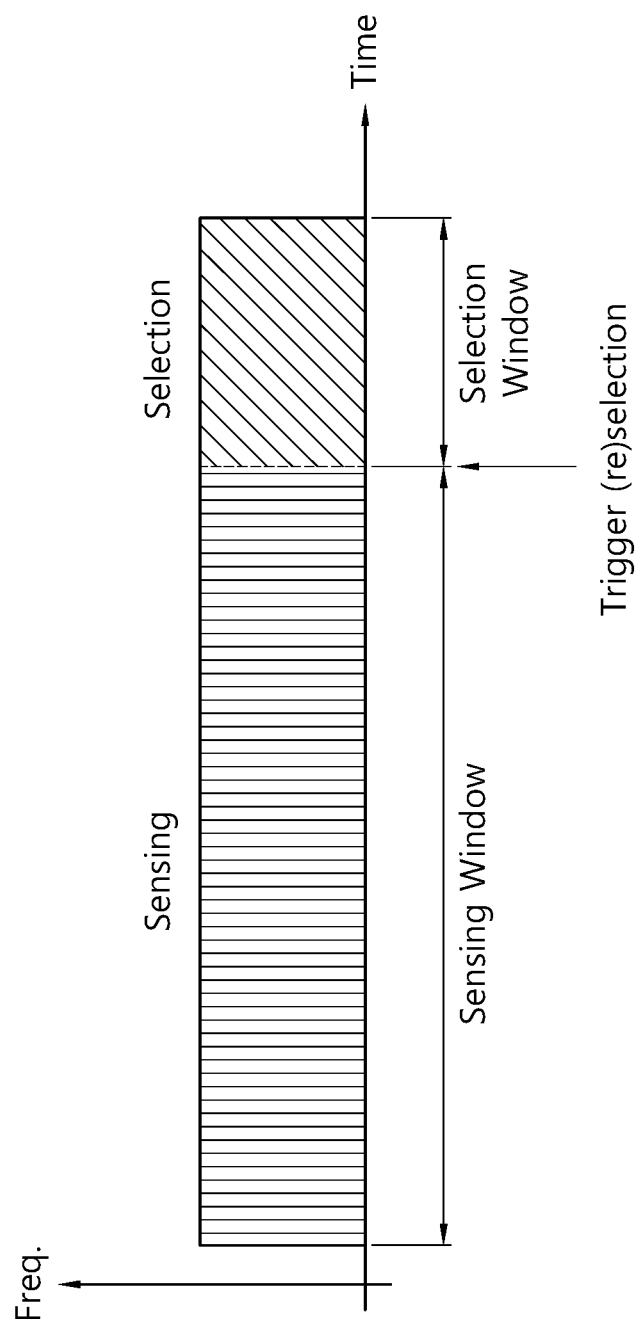
FIG. 17 shows an example where a transmission resource to which an exemplary embodiment of the present invention can be applied.

FIG. 17 shows an example where a transmission resource to which an exemplary embodiment of the present invention can be applied.

Referring to FIG. 17, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceed a threshold value from the selection window. Thereafter, the UE may randomly select a sidelink resource from the remaining resources within the selection window.

Alternatively, the UE may measure a Received signal strength indication (RSSI) of the periodic resources within the sensing window and may then determine the resources having low interference (e.g., the lower 20% of the resources). Additionally, the UE may also randomly select a sidelink resource from the resources included in the selection window among the periodic resources. For example, in case the UE fails to perform decoding of the PSCCH, the UE may use the above described methods.

Meanwhile, different services typically have different service requirements including different level of QoS as well as functional requirements. For this reason, when a UE wants to establish a direct connection with other UE for a certain service, it should be able to determine whether the direct connection between this direct link can fulfil the required service requirement and thus be able to perform a sort of admission control for the requested service. However, current mechanism of device-to-device communication cannot support such functionality. In this specification, the direct connection may be referred to as a PC5 RRC connection, and the device-to-device communication may be referred to as sidelink communication. In this specification, a remote UE may be referred to as a first UE or transmitting UE, and a host UE may be referred to as a second UE or receiving UE.

The procedure (messaging protocol) proposed below can be realized as direct RRC protocol. This realization requires introduction of the below message in RRC specification. If these direct RRC message are generated, the UE delivers the RRC messages to the PDCP entity applicable for or dedicated to the control plane of direct communication such that such direct RRC message is prioritized over other sidelink data transmission. Alternatively, the procedure (messaging protocol) proposed below can be realized as peer UE-to-peer UE PC5 signalling protocol defined at NAS layer.

Figure 18:
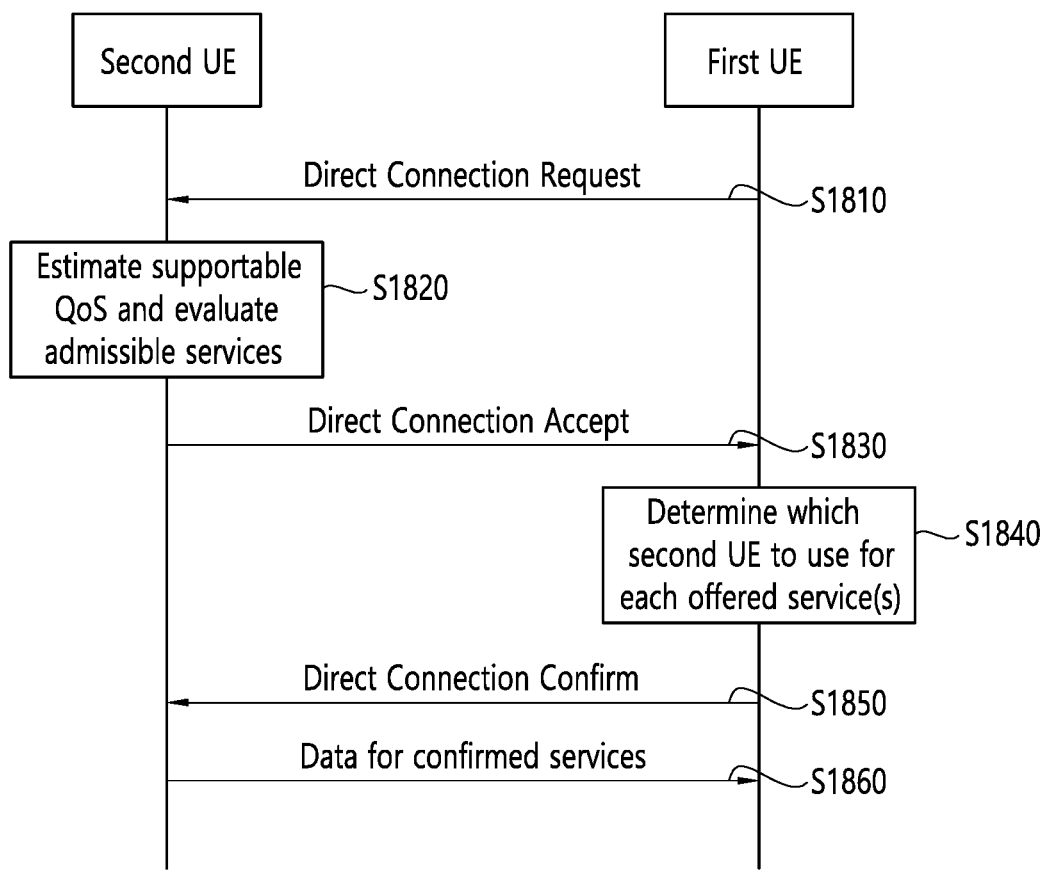
FIG. 18 shows a connection establishment procedure according to an embodiment of the present invention.

FIG. 18 shows a connection establishment procedure according to an embodiment of the present invention.

Referring to FIG. 18, in step S1810, the first UE may transmit a direct connection request message to request establish direct connection setup between the first UE and other UE (e.g. potential host UE or potential second UE) for service(s) requested by the first UE. For instance, the first UE may send the direct connection request message via broadcast by including broadcast L2 ID in the L2 header of the direct connection request message. In this specification, the direct connection may be referred to as a direct communication, an inter-UE communication, a PC5 RRC connection, a RRC connection or a connection. In this specification, the direct connection request message may be referred to as a direct communication request message, an inter-UE communication request message, a PC5 RRC connection request message, a RRC connection request message or a connection request message.

If L1 destination ID may be indicated over e.g. physical sidelink control channel to inform the transmission of the direct connection request message via broadcast, a broadcast L1 ID as destination ID may be indicated. If L1 destination ID may be indicated over e.g. physical sidelink control channel to inform resource reservation for transmission of the direct connection request message via broadcast, a broadcast L1 ID as destination ID may be indicated. L2 destination ID for broadcast may be indicated in MAC header for the transmitted transport block.

If the first UE already identified the ID of the potential second UE, the first UE may send the direct connection request message via unicast by addressing the potential second UE within the destination field for the transmission of this message. If L1 destination ID is indicated over e.g. physical sidelink control channel to inform the transmission of the direct connection request message via unicast, a unicast L1 ID as destination ID may be indicated. If L1 destination ID is indicated over e.g. physical sidelink control channel to inform resource reservation for transmission of the direct connection request message via unicast, a unicast L1 ID as destination ID may be indicated. If L2 destination ID is indicated in MAC header of the transmitted transport block such that receiving MAC is able to identify that this transport block is for unicast traffic. The direct connection request message may include at least one of the following information:

1) Service information that the first UE wants to get

The interesting/requested service may be indicated by service Identifier (SID) or service code (SCD). Multiple services may be indicated by listing the SIDs or SCDs.

The priority of services which indicates the importance of services. The potential second UE may use this information when admission control of services are needed due to the scarce of the resources or capabilities. ProSe Per-Packet Priority (PPPP) may be used to indicate the priority. Alternatively, the new priority dedicated for service admission control may be introduced.

2) Requested QoS information

The requested QoS information may indicate the required/desired QoS level for the requested service. The requested QoS information may need to be indicated per service level, if multiple services are requested. The requested QoS information may include at least one of the following QoS information:

2.1) Required QCI value or 5QI or new QoS indicator value representing the (partial) set of the QoS parameters: payload (bytes), transmission rate (message/sec or packets/sec), maximum end-to-end latency (ms), target communication range, reliability (%) or data rate (Mbps). The data rate may further indicate at least one of the following information:

Average data rate which indicates the desired data rate when channel is not congested.

Minimum data rate which indicates the minimum data rate which the associated services require to maintain the service. If the service requires guaranteed bit rate, this information is necessarily included.

Aggregated Maximum Bit Rate (AMBR) which indicates the maximum data rate to be supported over the requested PC5 direct communication.

2.2) If QCI or 5QI or the new QoS indicator cannot represent all the parameters presented above, the parameters not covered by the QoS indicator may be indicated together with the QoS indicator.

2.3) Sidelink traffic flow type (bearer type) which indicates whether the requested services requires guaranteed bit rate (GBR) or non-GBR.

2.4) Priority of each service: PPPP may be used to indicate the priority.

2.5) Minimum required communication range (meters)

2.6) Need for QoS prediction

The need for QoS prediction may indicate whether the requested service requires QoS prediction functionality, where QoS prediction functionality allows the served UE to be aware of the change of the expected QoS in advance (e.g. a certain QoS level is expected to degrade in 10 seconds).

The need for QoS prediction may further indicate the minimum timing advance by which the QoS change notification based on QoS prediction is notified to the first UE prior to the moment of actual QoS change.

The need for QoS prediction may further indicate the need for periodic update of QoS prediction notification to the first UE. The need for QoS prediction may further indicate the periodicity of the requested QoS prediction notification.

2.7) Need for supporting guaranteed QoS

This IE may indicate whether the requested service requires guaranteed QoS. The required QoS may be defined for a certain period of time. The period of time may indicate the minimum time period for which the promised QoS can be ensured. In this usage of the IE, the IE may further indicate the time period for which the requested QoS needs to be maintained This IE may be indicated with a minimum probability that the requested QoS needs to be satisfied.

3) Connection information

Type of direct connection: this IE may be either of "unicast" or "multicast" or "broadcast". In case this IE is not present, it indicates "unicast" by default.

Direction of direct connection: this IE may be either of "unidirectional with receiving only" or "unidirectional transmitting only" or "bidirectional".

Each service information being requested should be associated with one type of direct connection request. For this purpose, the connection information IE may need to be indicated per each service ID being requested.

4) Max waiting time for direct connection setup

This information may indicate the maximum waiting time for which the first UE can wait until establishment of requested direct communication since the connection is initially requested. To make sure that the potential second UE know when the connection was initially requested, the time information indicating the moment of initially constructing the direct connection request at the first UE may need to be included in the direct connection request message.

5) Sidelink capability information

The sidelink capability information may indicate the capabilities of the first UEs available for transmission and or reception over the requested direct communication. Transmission capabilities and reception capabilities may need to be indicated separately.

The sidelink capability information may further indicate the security capability of the first UE. This may include the supported ciphering algorithms and possibly related parameters. This may include the supported integrity check algorithms and possibly related parameters.

The sidelink capability information may further indicate the supported security capability. This may include supported ciphering algorithms. This may include supported integrity protection algorithms. This may include supported length of security key.

The sidelink capability information may indicate at least one of the following capability information for direction communication:

5.1) Information on the supported modulation order 5.2) Information on the supported channel coding scheme 5.3) Information on the supported RAT 5.4) Maximum transmit power for each supported RAT 5.5) Supported frequency bands for each supported RAT 5.6) Supported bandwidth for each supported band for direct communication 5.7) Supported band combination for direct communication: supported band combination for simultaneous reception for direct communication, and/or supported band combination for simultaneous transmission for direct communication 5.8) Supported band combination for concurrent Uu and direct communication: supported band combination for concurrent reception, supported band combination for concurrent transmission, supported band combination for concurrent reception of Uu and transmission of direct communication, and/or supported band combination for concurrent transmission of Uu and reception of direct communication 5.9) Duplex per RAT or per band per RAT: Half duplex or Full duplex 5.10) HARQ capabilities: this information may indicate the HARQ capabilities. This information may further indicate maximum number of HARQ processes. This information may further indicate at least one of the following information:

Support of HARQ feedback

Support of HARQ combining

Supported HARQ feedback signalling methods: HARQ feedback over sidelink control channel, HARQ feedback over sidelink data channel (i.e. HARQ feedback is piggy-bagged over data transmission), and/or HARQ feedback over MAC Control Element 5.11) Maximum number of layers (spatial multiplexing) per frequency or per RAT 5.12) Supported synchronization sources: support of GNSS as sync reference source, support of UE-transmitted synchronization (e.g. SLSS) as sync reference source, and/or support of network synchronization (downlink synchronization) as sync reference source 6) Initial ID of the first UE;

This ID may be layer-2 ID of the first UE. If this L2 ID is indicated, the potential second UE needs to use this L2 ID to address the first UE by including the L2 ID in the L2 header of the message destined to the first UE. If this L2 ID is not indicated, the potential second UE needs to use the L2 ID included in the L2 header of this direct connection request message.

Alternatively, this ID may be upper layer ID of the first UE. This ID may be used by upper layer of the receiving second UE to address the first UE 7) UE status information 7.1) UE location: this information may indicate the location of the first UE. This information may be used by the receiving UE (i.e. second UE) to determine whether the direct connection to be established can provide the requested QoS for the requested services. This information may be used for initial power control by calculating the distance between the first UE and the second UE. This information may be used for initial beamforming.

7.2) Channel Status information: this information may indicate the channel statistics perceived by the first UE. This information may indicate the statistics of channel utilization used by direct communications as well as potential/unidentified interferers.

Channel quality: this information may indicate the channel quality of the direct link between the first UE and the second UE. The first UE may measure the link quality by measuring the strength/quality of the signal transmitted by the second UE.

Channel utilization statistics: the statistics may be measured energy level. More compactly, the statistics may be channel busy ratio (CBR) measurements where the channel is detected as busy if the measured energy level on the concerned resource is higher than a threshold. The threshold used to measure the CBR may needs to be indicated. This information may indicate how much each resource group is being occupied in unit of percent (%). For instance, the resource group can be a channel define over a specific frequency range. For instance, the resource group can be a group of resource blocks. This information may need to be collected and signalled per each resource group. If the first UE supports direct communication over multiple RATs, this IE needs to be signalled per RAT of those RATs. This information may need to be collected and signalled per each carrier frequency if more than one frequency can be used for direct communication. This information may need to be collected and signalled per each resource pool per each RAT that can be possibly used for the direct communication being requested.

7.3) On-going sidelink service information

The on-going sidelink service information may indicate the on-going sidelink service(s) and/or the attributes of the services for which the first UE has been transmitting or willing to transmit packets over sidelink. The second UE may use this information to better estimate the reception opportunities of the first UE by taking half-duplex constraints into account and thus to better select the transmission resources.

The on-going sidelink service information may indicate the on-going sidelink service(s) and/or the attributes of the services for which the first UE has been receiving or is willing to receive packets over sidelink. The second UE may use this information to better select the transmission resources by taking e.g. the priority of the on-going service of the first UEs and new services to be offered to the first UE into account. This information may be useful to alleviate the potential collision of reception resource at the first UE when the transmission from the second UE to the first UE may collide with transmission from other UE to the first UE.

The on-going sidelink service information may be delivered as a part of the channel status information. The on-going sidelink service information may further indicate the required priority of each on-going service, e.g. ProSe Per Packet Priority (PPPP). The on-going sidelink service information may further indicate the required reliability of each on-going service, e.g. ProSe Per Packet Reliability (PPPR).

The on-going sidelink service information may further indicate the required QoS information of the service. For instance, this may indicate average payload size, data rate, and/or maximum delay that are required by the on-going service. For instance, this may indicate required QCI value required by the on-going service. For instance, this may indicate required 5QI value required by the on-going service.

The on-going sidelink service information may further indicate at least one of the following information on each on-going service:

- Average payload (bytes) of the message transmitted/received for the concerned service
- Average transmission rate (message/sec or transport blocks/sec) in case of on-going service that transmits message
- Average message arrival rate, which indicates the arrival rate of the message from upper layer for transmission in case of on-going service that transmits message
- Average message arrival rate, which indicates the arrival rate of the message from lower layer after reception in case of on-going service that receives message
- Average transmission delay (ms) (measured as the time duration between when the message is arrived at radio protocol stack and when the message is actually transmitted over the air)
- Estimated transmission reliability (%)

This estimate related to transmission reliability can be made by considering the statistics of the received HARQ ACK and/or HARQ NACK. The average reliability can be averaged over a moving fixed size time window. For instance, the average reliability may be obtained based on the equation 1.

$$\text{average reliability} = \frac{\text{the number of total received } HARQ\ ACKs}{\text{the total number of total transmitted } TBs} \quad \text{[Equation 1]}$$

Alternatively, the average reliability can be average by applying exponentially weighted moving average (EWMA) over time. For instance, the average reliability may be obtained based on the equation 2.

$$\text{average reliability}(n) = (1-k)*\text{average reliability}(n-1) + k*\text{instantaneous reliability}(n) \quad \text{[Equation 2]}$$

where k is small value close to zero (e.g. 0.1) and the instantaneous reliability is measured as averaging the ratio defined above.

This estimate related to transmission reliability can be made by collecting the statistics of PDCP transmit buffer used by the concerned service. The average reliability can be measured by averaging the ratio of the number of transmitted packets to the number of the packets arrived from upper layers.

Estimated reception reliability (%)

This estimate related to reception reliability can be made by considering the transmitted HARQ ACK and/or HARQ NACK. The same average method defined above for calculating transmission reliability can be used;

- To inform the second UE of the overall traffic statistics for the concerned service, it is sufficient to collect the statistics over entire frequencies over which the packets of the concerned service have been transmitted, and it is also sufficient to collect the statics over entire frequencies over which the packets of all the concerned services have been transmitted. To assist the second UE to choose better resource configuration for the first UE, the above statistics may need to be collected and indicated per frequency/channel.

The on-going sidelink service information may further indicate at least one of the following information to help the second UE avoid using the resources that are/can be used by the first UEs:

Information on the transmission resources (time/frequency information). The information on the transmission resources may indicate the resources reserved for pending or future transmissions of the concerned on-going service. For instance, the information on the transmission resources may indicate the pattern of the resources to be used for the concerned transmissions. For instance, the information on the transmission resources may indicate a) time offset that can be used to identify the starting point of the reservation interval, and b) retransmission interval (e.g. gap between initial and retransmission), c) the reservation interval (e.g. data transmission periodicity), and/or d) reservation termination time (e.g. reservation is valid until the reservation termination time). The information on the transmission resources may indicate the resource set that is dedicatedly allocated for the concerned on-going service. The information on the transmission resources may be constructed by collectively merging the transmission resources related to multiple on-going services to reduce signalling overhead, rather than signalling the transmission resources per service. The information on the transmission resources may be interpreted as prohibitive transmission resources by the second UEs if the first UE is subject to half-duplex constraint.

Information on the reception resources (time/frequency information). The information on the reception resources may indicate the resources (or resource pool) that can be used for reception of the concerned on-going service. For instance, the information on the reception resources may indicate the pattern of the resources to be used for the concerned reception. The information on the reception resources may indicate the resource set that is dedicatedly allocated for the concerned on-going service. The information on the reception resources may be constructed by collectively merging the reception resources related to multiple on-going services to reduce signalling overhead, rather than signalling the reception resources per service. The information on the reception resources may be interpreted as prohibitive transmission resources by the second UEs in case the first UE is subject to hidden node problem.

7.4) In-coverage/out-of-coverage information

The in-coverage/out-of-coverage information may indicate whether the first UE is currently inside network or out of network coverage. If the first UE supports multiple RATs, it may need to signal the information per each RAT. If the first UE is configured with dual connectivity, it may indicate the connectivity status with respect to the primary cell. The in-coverage/out-of-coverage information may be useful when the primary cell can control the connection for the concerned direct communication being requested.

7.5) Current sync source information: this information may indicate whether the first UE can receive GNSS signal.

7.6) Transmit power used to transmit the direct connection request message: this information can be used by the second UE to estimate the pathloss between the first UE and the second UE and to determine and control the transmission power of the first UE as well as the transmission power of the second UE.

8) UE subscription information or subscribed PLMN information

The subscribed PLMN information may indicate the home PLMN of the UE for cellular services including PC5. The subscribed PLMN information may indicate the PLMN(s) for which PC5 operations are granted for the UE. The subscribed PLMN information may indicate the PLMN(s) for which PC5 operations for the requested services are granted for the UE. The subscribed PLMN information may need to signalled per service. The subscribed PLMN information may further indicate at least one of the following information:

Home PLMN per RAT: this is the case when UE supports multiple RATs and each RAT is associated with same or different home PLMNs (e.g. Dual SIM Dual Active, DSDA)

Supported RATs per allowed PLMN;

Allowed operation: this indicates which of the following operations are allowed for the PLMNs (e.g. transmission only, reception only, or both transmission and reception)

9) Preferred configuration (preferred scheduling mode for transmission of the first UE)

The preferred configuration may indicate the preferred way of scheduling for transmission of the first UE. The preferred configuration may include 'both the second UE-scheduling and the first UE autonomous scheduling (=don't care)' or 'only the first UE autonomous scheduling'. For instance, the first UE may set this IE to "only the first UE autonomous scheduling" if it does not lose the freedom of transmission resource selection.

For failure handing, upon sending the direct connection request message, the first UE starts a timer T_CONN. If T_CONN expires, the first UE considers that the connection request fails. The first UE starts a timer T_INT.

While the T_INT is running, the first UE is not allowed to request direct connection setup for the same service with the same QoS requirements. The T_INT is managed per a set of services requested in the same message. Therefore, multiple T_INT may be running at the same time. The value of T_CONN and T_INT can be configured to the first UE by network or those values can be preset.

While T_INT is running, the first UE is allowed to initiate direct connection setup, if it want to request a new service. While T_INT is running, the first UE is allowed to initiate direct connection setup while T_INT is running if it want to request a new service. While T_INT is running, the first UE is allowed to initiate direct connection setup while T_INT is running if it wants to request a service that resulted in the running T_INT with different QoS requirements.

In step S1820, the second UE may estimate supportable QoS and evaluate admissible services. Upon receiving the direct connection request message from other UE (i.e. first UE), a potential second UE performs the following to determine if it accepts the direct connection request received from the first UE:

if the potential second UE can offer at least one of the requested services by considering its capabilities with respect to service information included in the direct connection request message, and/or if the potential second UE can support the requested type of direct connection, and/or if the potential second UE can support the requested QoS for the services supported by the potential second UE by considering its capabilities, first UE capabilities, link status/utilization based on the monitoring results from the second UE perspective as well as first UE's UE status information included in the direct connection request message, and/or if the potential second UE ensures that the first UE has a valid subscription on the requested services, e.g. in terms of PLMN, and/or if the potential second UE ensures that the first UE is not forbidden for the requested service and for the requested type of direct connection.

If all these conditions are satisfied, the potential second UE may decide to accept the direct connection request. If at least one of these conditions is satisfied, the potential second UE may decide to accept the direct connection request. Depending on considered embodiments, a subset of the above conditions can be checked.

In step S1830, if the potential second UE accepts the direct connection request, the second UE may send the direct connection accept message. Otherwise, the potential second UE may send direct connection reject message. In FIG. 18, it is assumed that the second UE accepts the direct connection request. In this specification, the direct connection accept message may be referred to as a direct communication accept message, an inter-UE communication accept message, a PC5 RRC connection accept message, a RRC connection accept message or a connection accept message. The direct connection accept message may include at least one of the following information:

1) Accepted service ID/code

If the first UE has requested a single service ID/code, then this ID/code needs not be included.

2) Reason for service denials

For the service that is not accepted, the reason of the service denial may be indicated. The reason may be at least one of 'request from unauthorized UE', 'request from forbidden UE', or 'lack of capability in offering requested QoS'. The cause 'lack of capability in offering requested QoS' may further indicate 'lack of transmission resources', 'lack of reception resources', or 'lack of both transmission resources and reception resources'.

3) Traffic flow information

For the accepted service(s), the associated traffic flow ID may be indicated. This traffic flow ID may be used when host addresses or identifies a particular traffic flow of the connection for sidelink communication. This flow ID may be used for radio resource configuration as given below.

Traffic flow ID construction rule:

Alt.1) Traffic flow ID is uniquely assigned across all traffic flows including "unidirectional" service for both directions and "bidirectional" services.

Alt.2) Traffic flow ID is uniquely assigned across traffic flows having the same direction. Therefore, the traffic flow ID needs information indicating the direction of communication (e.g. "forward (second to first)" or "reverse (first to second)") to be uniquely distinguishable across all traffic flows including "unidirectional" service for both directions and "bidirectional" services.

The traffic flow ID may be different per direction of direct communication of "bidirectional" services 4) Offered QoS information 4.1) Expected QoS The expected QoS information may indicate the expected QoS level to be experienced for the accepted service. The format of IEs that can be included in the requested QoS information in the direct connection request message can be reused here. The expected QoS information may need to be indicated per accepted service (ID). The expected QoS information may be indicated per QoS parameters requested by the first UE for the requested service being accepted.

4.2) Support of guaranteed QoS

This may indicate whether the offered QoS can be guaranteed. The required QoS may be defined for a certain period of time. The period of time may indicate the minimum time period for which the promised QoS can be ensured. In this usage of the IE, the IE may further indicate the time period for which the offered QoS can be maintained. This IE may be indicated together with a minimum probability of satisfying the offered QoS. The first UE will utilize this probability to determine whether it proceeds/accepts the unicast link establishment with the QoS level offered by the second UE.

5) Sidelink capability information

The sidelink capability information may indicate the capabilities of the second UEs about transmission and/or reception over direct communication interface. Transmission capabilities and reception capabilities may need to be indicated separately. This second UE includes reception capabilities if the direction of direct communication requested by the first UE is "unidirectional with transmit only" or "bidirectional".

6) Radio resource configuration for sidelink

The radio resource configuration for sidelink may indicate the radio resource parameters to be used for the direct communication link being established. This IE may include at least one of the following:

6.1) Initial ID of the second UE

This ID can be upper layer ID of the second UE. This ID can be used by upper layer of the first UE to address the second UE. This ID can be layer-2 ID of the second UE. If this L2 ID is indicated, the first UE needs to use this L2 ID to address the second UE by including the L2 ID in the L2 header of the message destined to the second UE. If this L2 ID is not indicated, the first UE needs to use the L2 ID included in the L2 header of this direct connection accept message.

6.2) Sidelink resource pool structure which indicates the following information:

Control channel structure: time-frequency resources comprising physical sidelink control channel Data channel structure: time-frequency resources comprising physical sidelink data channel Multiple resource pools may be indicated. For each resource pool, associated services/traffic flow ID(s) may be indicated. Alternatively, for each service/traffic flow ID, the associated resource pool(s) may be indicated. Note that this mapping of resource pool to service/traffic flow ID implies the mapping of frequency (channel) to service.

6.3) Scheduling mode

This indicates the transmission resource selection scheme that the first UE shall use.

Network-scheduled resource selection; this can be set only if the first UE has indicated that it is in network coverage.

Second UE-scheduled resource selection;

First UE autonomous resource selection;

This configuration can be per UE. Alternatively, this configuration is provided per service/traffic flow such that a service/traffic flow with more stringent QoS requirements are differently treated possibly with a tighter control.

6.4) Synchronization configuration

This indicates the synchronization reference source to be used for direct communication being established. For instance, information may indicate that GNSS is a prioritized synchronization reference. For instance, information may indicate that UE-transmitted synchronization (e.g. SLSS) is a prioritized synchronization reference. For instance, information may indicate that downlink synchronization signal is a prioritized synchronization reference. For instance, information may indicate the priority of synchronization reference among downlink synchronization signal, GNSS and UE-transmitted synchronization signal. For instance, information may indicate that the second UE is a synchronization reference. In this case, the information may be synchronization signal identification information, e.g. SLSS ID to be used by the second UE for SLSS transmission. For instance, information may indicate that the first UE is a synchronization reference. In this case, the information may be synchronization signal identification information, e.g. SLSS ID to be used by the first UE for SLSS transmission. For instance, information may indicate that distributed synchronization reference is used. If no information is provided on synchronization configuration, the first UE keeps using the present synchronization method.

6.5) HARQ configuration

This configuration can be per UE. Alternatively, this configuration is provided per service/traffic flow such that a service/traffic flow with more stringent QoS requirements are differently treated possibly with a tighter control.

HARQ retransmission configuration: This configuration may indicate whether HARQ retransmission is based on HARQ feedback or whether HARQ retransmission is performed without HARQ feedback.

Feedback configuration: HARQ feedback signalling method to be used for the direct communication. This configuration may indicate whether HARQ feedback is required or not. This information may need to be indicated per each communication direction (from/to first UE) depending on the capabilities of HARQ of the first UE and the second UE as well as direction of direct communication being established. This information may needs to be indicated per communication direction per accepted service/traffic flow;

Number of HARQ processes, e.g., number of HARQ processes to be used by the first UE or number of HARQ processes to be used by the second UE Number of retransmissions: The number of HARQ retransmission may be indicated. The number of HARQ retransmission may be configured for the case when HARQ retransmission is configured to be performed without HARQ feedback (i.e. blind HARQ retransmission). In this case the number of blind retransmissions may be further defined or indicated by the configuration. In this case, HARQ combining is applied to the received transport blocks including a new transmission and up to the number of retransmissions. The number of HARQ retransmission may be configured for the case when HARQ retransmission is configured to be performed with HARQ feedback (i.e. HARQ feedback based HARQ retransmission). In this case the number of retransmissions may indicate the outcome of the (re)transmission for which HARQ feedback is generated. For example, 1 retransmission number is configured for HARQ with HARQ feedback, the second UE needs to send HARQ NACK if the collective outcome of receiving two transmissions (one new transmission+one retransmission) indicates an unsuccessful transmissions.

6.6) Transmit power control configuration

This configuration can be per UE. Alternatively, this configuration is provided per service/traffic flow such that a service/traffic flow with more stringent QoS requirements are differently treated possibly with a tighter control.

Power control method, e.g., open loop power control or closed loop power control Power control parameter including base transmit power (Po) and/or step power adjustment level (Pi). For instance, the first UE needs to transmit with transmit power Po when ignoring Pi. For instance, signalled Pi can be a single integer value with either plus or minus value. For instance, signalled Pi can be a value within a range. The first UE needs to transmit with transmit power Po+accumulated value of received Pi's.

7) Transaction ID

This transaction ID uniquely identifies the message contents. If the message is retransmitted to achieve diversity gain due to less-robust nature of D2D networks, the transaction ID is the same. For the same direct connection setup procedure, the transaction ID is the same.

The direct connection accept message is desirably addressed only to the first UE by setting the destination field of this message to first UE ID such that other UE receiving this message can ignore the message. The destination field for the transmission of the message may exist in layer1 where control channel indicates the field and layer 2 where MAC header indicates the field.

In case that the second UE transmits a direct connection reject message, the direct connection reject message may include the reason for denial IE to inform the first UE of the reason of the reject of direct connection establishment.

For failure handling, upon sending the direct connection accept message, the potential second UE starts a timer T_CONN2. If T_CONN2 expires, the potential second UE considers that the connection establishment for direct communication fails.

In step S1840, upon receiving the direct connection accept message, the first UE may perform the following to determine if the first UE accepts the direct connection accept:

if the accepted services are sufficient/acceptable for the first UE to establish the direct connection with the second UE, and/or if the expected QoS for the accepted services are sufficient/acceptable for the first UE to establish the direct connection with the second UE, and/or if the first UE ensures that the second UE has a valid subscription to provide the accepted services, e.g. in terms of PLMN, and/or if the first UE ensures that the second UE is not forbidden for providing the requested service.

In step S1850, if all or at least one of these conditions are satisfied, the first UE may decide to establish the direct connection with the second UE and send direct connection confirm message carrying the following information:

Confirmed service information including a list of services that the first UE wants over the direct connection being established ID of the second UE to which the direct connection confirm message is destined.

Transaction ID which uniquely identifies the message contents. If the message is retransmitted to achieve diversity gain due to less-robust nature of D2D networks, the transaction ID is the same. For the same direct connection setup procedure, the transaction ID is the same.

In step S1860, the first UE may receive data for confirmed services from the second UE. For instance, the data for confirmed services may be received via established connection (e.g. PC5 RRC connection) between the first UE and the second UE.

Figure 19:
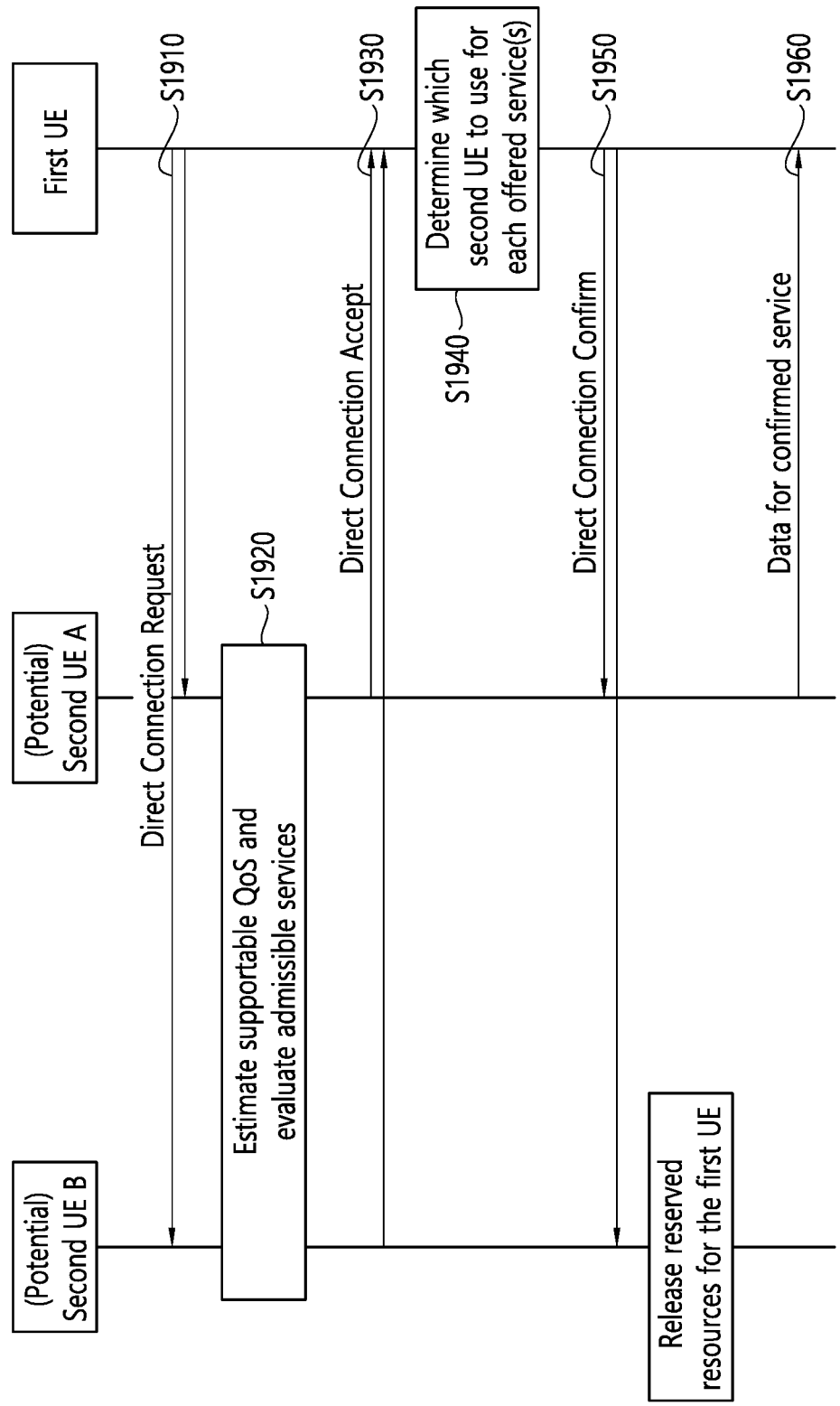
FIG. 19 shows a connection establishment procedure according to an embodiment of the present invention.

FIG. 19 shows a connection establishment procedure according to an embodiment of the present invention.

Referring to FIG. 19, in step S1910, the first UE may transmit a direct connection request message to request establish direct connection setup between the first UE and other UE (e.g. potential second UE A and potential second UE B) for service(s) requested by the first UE. The direct connection request message has already been described in detail in step S1810 of FIG. 18, and therefore, detailed description of step S1910 will be omitted.

In step S1920, the potential second UE A and the potential second UE B may estimate supportable QoS and evaluate admissible services. Upon receiving the direct connection request message from other UE (i.e. first UE), the potential second UE A and the potential second UE B performs the following to determine if it accepts the direct connection request received from the first UE:
- if the potential second UE can offer at least one of the requested services by considering its capabilities with respect to service information included in the direct connection request message, and/or
- if the potential second UE can support the requested type of direct connection, and/or
- if the potential second UE can support the requested QoS for the services supported by the potential second UE by considering its capabilities, first UE capabilities, link status/utilization based on the monitoring results from the second UE perspective as well as first UE's UE status information included in the direct connection request message, and/or
- if the potential second UE ensures that the first UE has a valid subscription on the requested services, e.g. in terms of PLMN, and/or
- if the potential second UE ensures that the first UE is not forbidden for the requested service and for the requested type of direct connection.

If all these conditions are satisfied, the potential second UE may decide to accept the direct connection request. If at least one of these conditions is satisfied, the potential second UE may decide to accept the direct connection request. Depending on considered embodiments, a subset of the above conditions can be checked.

In step S1930, if the potential second UE A and the potential second UE B accepts the direct connection request, the potential second UE A and the potential second UE B may send the direct connection accept message. Otherwise, the potential second UE A and the potential second UE B may send direct connection reject message. In FIG. 19, it is assumed that the potential second UE A and the potential second UE B accepts the direct connection request. The direct connection accept message has already been described in detail in step S1830 of FIG. 18, and therefore, detailed description of step S1930 will be omitted.

In step S1940, upon receiving the direct connection accept message, the first UE may perform the following to determine if the first UE accepts the direct connection accept:
- if the accepted services are sufficient/acceptable for the first UE to establish the direct connection with the potential second UE A or the potential second UE B, and/or
- if the expected QoS for the accepted services are sufficient/acceptable for the first UE to establish the direct connection with the potential second UE A or the potential second UE B, and/or
- if the first UE ensures that the potential second UE A or the potential second UE B has a valid subscription to provide the accepted services, e.g. in terms of PLMN, and/or
- if the first UE ensures that the potential second UE A or the potential second UE B is not forbidden for providing the requested service.

In step S1950, if all or at least one of these conditions are satisfied, the first UE may decide to establish the direct connection with the potential second UE A or the potential second UE B, and send a direct connection confirm message or a direct connection denial message. In FIG. 19, it is assumed that the first UE decides to establish the direct connection with the potential second UE A, not the potential second UE B. Then, the first UE may send the direct connection confirm message to the potential second UE A, and send the direct connection denial message to the potential second UE B. The direct connection confirm message has already been described in detail in step S1850 of FIG. 18, and therefore, detailed description of step S1950 related to the direct connection confirm message will be omitted.

Specifically, since there may exist multiple potential second UEs that each provide direct connection accept with different offered services/different level of QoS, the first UE may wait some time to collect possibly multiple direct connection accept messages since it sends the direct connection request message. After collecting the direct connection accept messages(s), the first UE chooses the best second UE based on the offered services and supported QoS and responds to the chosen second UE by sending the direct connection confirm message addressed to the selected second UE (i.e. potential second UE A of FIG. 19). When choosing the best second UE, the UE may prioritize the second UE that provides the best QoS for the service of higher priority.

If the first UE decides to reject the direct connection with the potential second UE B, the first UE may send a direct connection denial message to the potential second UE B. In specification, the direct connection denial message may be referred to as a direct communication denial message, a direct connection reject message, a direct communication reject message, denial message or reject message. The direct connection denial message may include ID of the second UE to which the direct communication reject message is destined.

Alternatively, if the first UE decides to reject the direct connection with the potential second UE B, the first UE does not send any message. In this embodiment, the potential second UE B will eventually identify the failure of the connection of direct communication based on expiry of a timer that started upon transmission of the direct communication accept message.

Note that the direct connection confirm message is necessary to resolve the case where more than two host UEs replies with direct communication accept message. This works as follows. If the potential second UE B receives, from the first UE to which the potential second UE B sends the direct connection accept message, the direct connection confirm message that includes a ID of the first and a ID of the potential second UE A that is different from a ID of the potential second UE B included in the direct connection accept message, the potential second UE B may consider that the connection establishment procedure fails. And, the potential second UE B may stop any further processing related to the direct connection request message received from the first UE and release any resources prepared for the first UE.

Upon sending the direct connection confirm message, the first UE may consider that the requested direct connection is established for the confirmed services. Alternatively it is possible that the first UE considers that the requested direct connection is established for the confirmed services after a fixed time (T_gap) has passed upon sending the direct connection confirm message. The T_gap may be signalled in the direct connection accept message. Upon receiving the direct connection confirm message, the potential second UE A may consider that the requested direct connection is established for the confirmed services.

In step S1960, the first UE may receive data for confirmed services from the potential second UE A. For instance, the data for confirmed services may be received via established connection (e.g. PC5 RRC connection) between the first UE and the potential second UE A.

Figure 20:
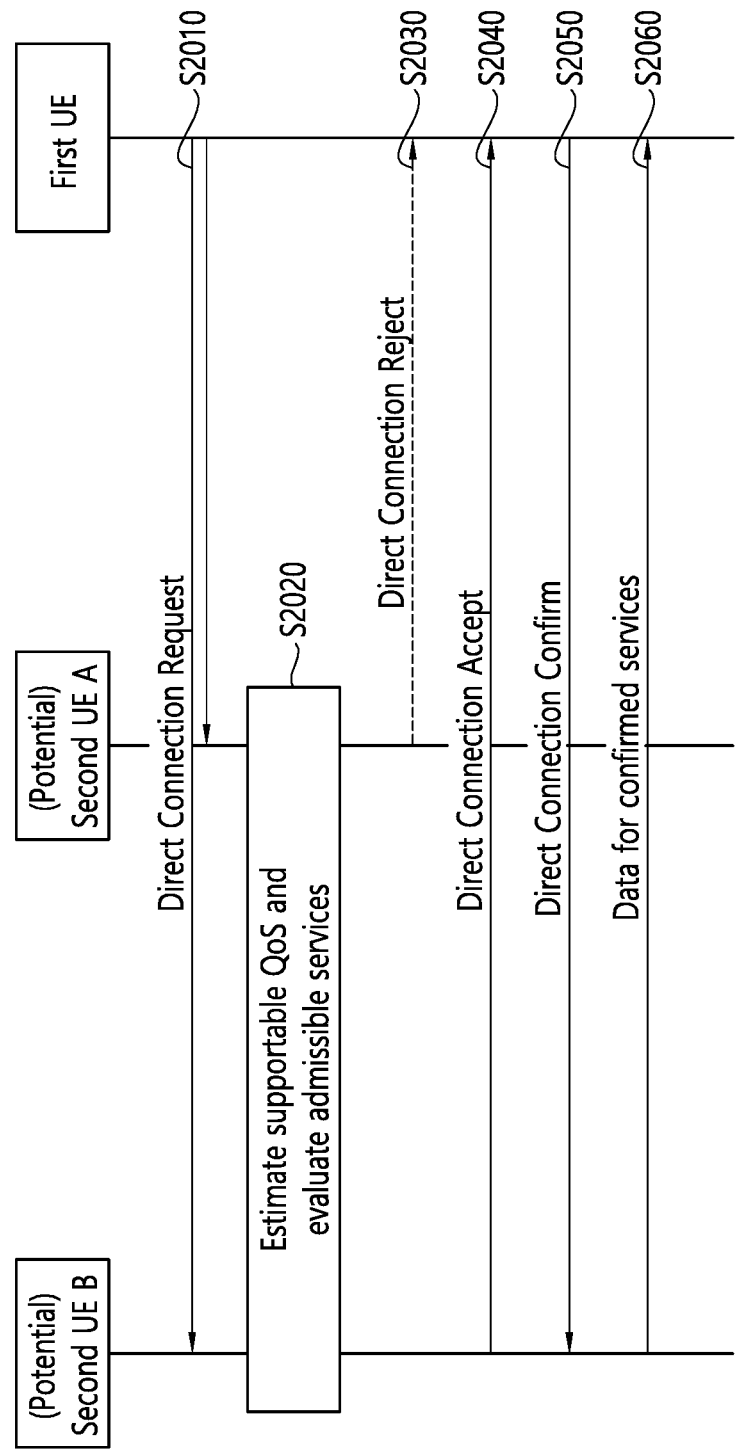
FIG. 20 shows a connection establishment procedure according to an embodiment of the present invention.

FIG. 20 shows a connection establishment procedure according to an embodiment of the present invention.

Referring to FIG. 20, in step S2010, the first UE may transmit a direct connection request message to request establish direct connection setup between the first UE and other UE (e.g. potential second UE A and potential second UE B) for service(s) requested by the first UE. The direct connection request message has already been described in detail in step S1810 of FIG. 18, and therefore, detailed description of step S2010 will be omitted.

In step S2020, the potential second UE A and the potential second UE B may estimate supportable QoS and evaluate admissible services. Upon receiving the direct connection request message from other UE (i.e. first UE), the potential second UE A and the potential second UE B performs the following to determine if it accepts the direct connection request received from the first UE:
- if the potential second UE can offer at least one of the requested services by considering its capabilities with respect to service information included in the direct connection request message, and/or
- if the potential second UE can support the requested type of direct connection, and/or
- if the potential second UE can support the requested QoS for the services supported by the potential second UE by considering its capabilities, first UE capabilities, link status/utilization based on the monitoring results from the second UE perspective as well as first UE's UE status information included in the direct connection request message, and/or
- if the potential second UE ensures that the first UE has a valid subscription on the requested services, e.g. in terms of PLMN, and/or
- if the potential second UE ensures that the first UE is not forbidden for the requested service and for the requested type of direct connection.

If all these conditions are satisfied, the potential second UE may decide to accept the direct connection request. If at least one of these conditions is satisfied, the potential second UE may decide to accept the direct connection request. Depending on considered embodiments, a subset of the above conditions can be checked. In FIG. 20, it is assumed that the potential second UE B accepts the direct connection request while the potential second UE A rejects the direct connection request.

In step S2030, if the potential second UE A rejects the direct connection request, the potential second UE A may send a direct connection reject message to the first UE. The direct connection reject message may include the reason for denial IE to inform the first UE of the reason of the reject of direct connection establishment.

In step S2040, if the potential second UE B accepts the direct connection request, the potential second UE B may send the direct connection accept message. The direct connection accept message has already been described in detail in step S1830 of FIG. 18, and therefore, detailed description of step S2040 will be omitted.

In step S2050, upon receiving the direct connection accept message, the first UE may perform the following to determine if the first UE accepts the direct connection accept:
- if the accepted services are sufficient/acceptable for the first UE to establish the direct connection with the potential second UE B, and/or
- if the expected QoS for the accepted services are sufficient/acceptable for the first UE to establish the direct connection with the potential second UE B, and/or
- if the first UE ensures that the potential second UE B has a valid subscription to provide the accepted services, e.g. in terms of PLMN, and/or
- if the first UE ensures that the potential second UE B is not forbidden for providing the requested service.

If all or at least one of these conditions are satisfied, the first UE may decide to establish the direct connection with the potential second UE B, and send a direct connection confirm message. The direct connection confirm message has already been described in detail in step S1850 of FIG. 18, and therefore, detailed description of step S2050 related to the direct connection confirm message will be omitted.

In step S2060, the first UE may receive data for confirmed services from the potential second UE B. For instance, the data for confirmed services may be received via established connection (e.g. PC5 RRC connection) between the first UE and the potential second UE B.

Figure 21:
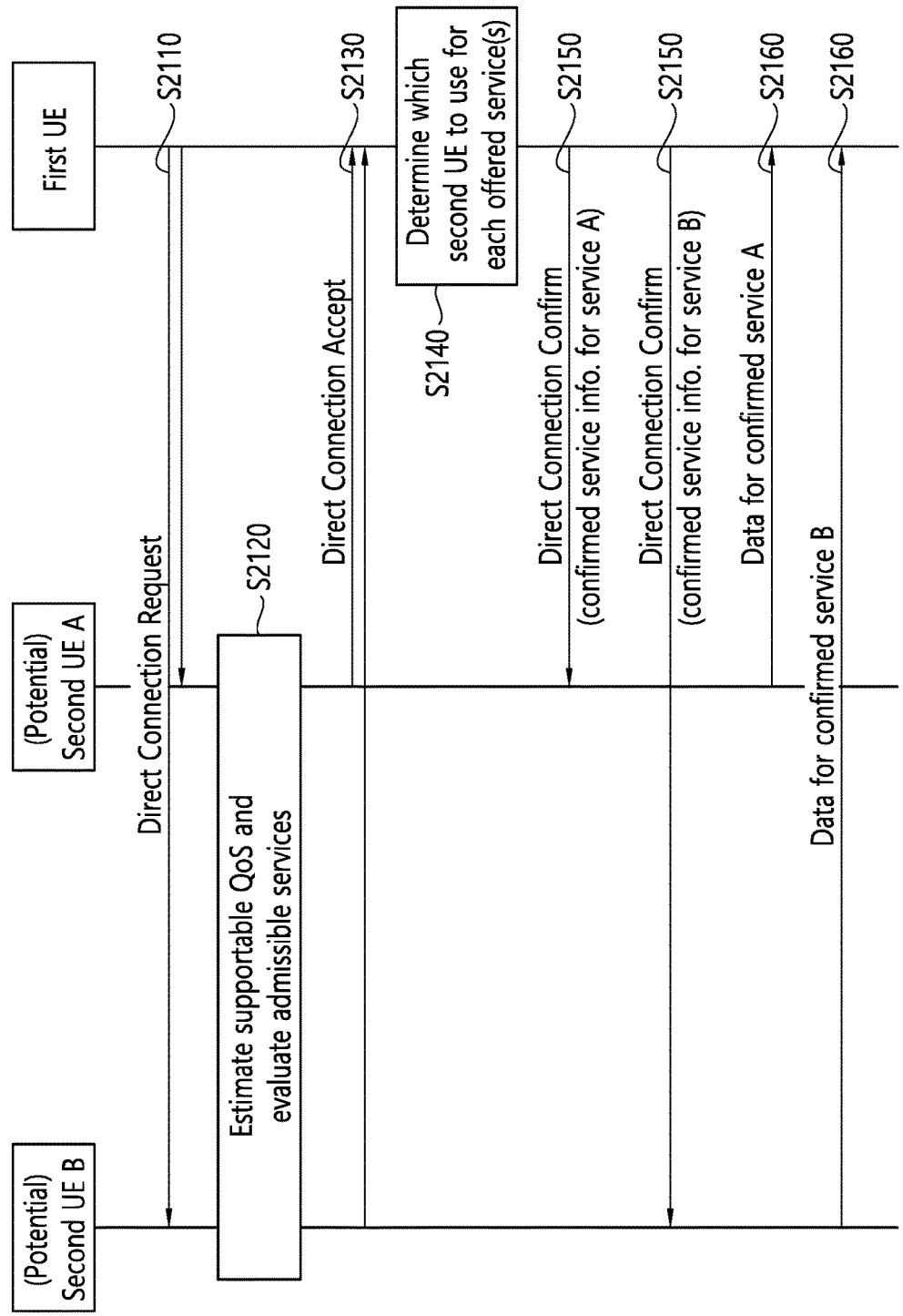
FIG. 21 shows a connection establishment procedure according to an embodiment of the present invention.

FIG. 21 shows a connection establishment procedure according to an embodiment of the present invention.

Referring to FIG. 21, in step S2110, the first UE may transmit a direct connection request message to request establish direct connection setup between the first UE and other UE (e.g. potential second UE A and potential second UE B) for service(s) requested by the first UE. The direct connection request message has already been described in detail in step S1810 of FIG. 18, and therefore, detailed description of step S2110 will be omitted.

In step S2120, the potential second UE A and the potential second UE B may estimate supportable QoS and evaluate admissible services. Upon receiving the direct connection request message from other UE (i.e. first UE), the potential second UE A and the potential second UE B performs the following to determine if it accepts the direct connection request received from the first UE:
- if the potential second UE can offer at least one of the requested services by considering its capabilities with respect to service information included in the direct connection request message, and/or
- if the potential second UE can support the requested type of direct connection, and/or
- if the potential second UE can support the requested QoS for the services supported by the potential second UE by considering its capabilities, first UE capabilities, link status/utilization based on the monitoring results from the second UE perspective as well as first UE's UE status information included in the direct connection request message, and/or if the potential second UE ensures that the first UE has a valid subscription on the requested services, e.g. in terms of PLMN, and/or if the potential second UE ensures that the first UE is not forbidden for the requested service and for the requested type of direct connection.

If all these conditions are satisfied, the potential second UE may decide to accept the direct connection request. If at least one of these conditions is satisfied, the potential second UE may decide to accept the direct connection request. Depending on considered embodiments, a subset of the above conditions can be checked. In FIG. 21, it is assumed that the potential second UE A accepts the direct connection request for service A and the potential second UE B accepts the direct connection request for service B.

In step S2130, if the potential second UE A accepts the direct connection request for the service A, the potential second UE A may send the direct connection accept message including accepted service ID/code to the first UE. If the potential second UE B accepts the direct connection request for the service B, the potential second UE B may send the direct connection accept message including accepted service ID/code to the first UE. The direct connection accept message has already been described in detail in step S1830 of FIG. 18, and therefore, detailed description of step S2130 will be omitted.

In step S2140, upon receiving the direct connection accept message, the first UE may perform the following to determine if the first UE accepts the direct connection accept:

if the accepted services are sufficient/acceptable for the first UE to establish the direct connection with the potential second UE A or the potential second UE B, and/or if the expected QoS for the accepted services are sufficient/acceptable for the first UE to establish the direct connection with the potential second UE A or the potential second UE B, and/or if the first UE ensures that the potential second UE A or the potential second UE B has a valid subscription to provide the accepted services, e.g. in terms of PLMN, and/or if the first UE ensures that the potential second UE A or the potential second UE B is not forbidden for providing the requested service.

In step S2150, if all or at least one of these conditions are satisfied, the first UE may decide to establish the direct connection with the potential second UE A and the potential second UE B, and send a direct connection confirm message for the service A and the service B to the potential second UE A and the potential second UE B, respectively. That is, the first UE may send the direct connection confirm message for the service A to the potential second UE A, and send the direct connection confirm message for the service B to the potential second UE B. According to an embodiment of the present invention, it is possible that the first UE chooses different second UE for different services. In this case, the first UE may send multiple direct connection confirm messages to each potential second UE selected for each service. The direct connection confirm message has already been described in detail in step S1850 of FIG. 18, and therefore, detailed description of step S2150 related to the direct connection confirm message will be omitted.

In step S2160, the first UE may receive data for confirmed service A from the potential second UE A. For instance, the data for confirmed service A may be received via established connection (e.g. PC5 RRC connection) between the first UE and the potential second UE A. Also, the first UE may receive data for confirmed service B from the potential second UE B. For instance, the data for confirmed service B may be received via established connection (e.g. PC5 RRC connection) between the first UE and the potential second UE B.

Figure 22:
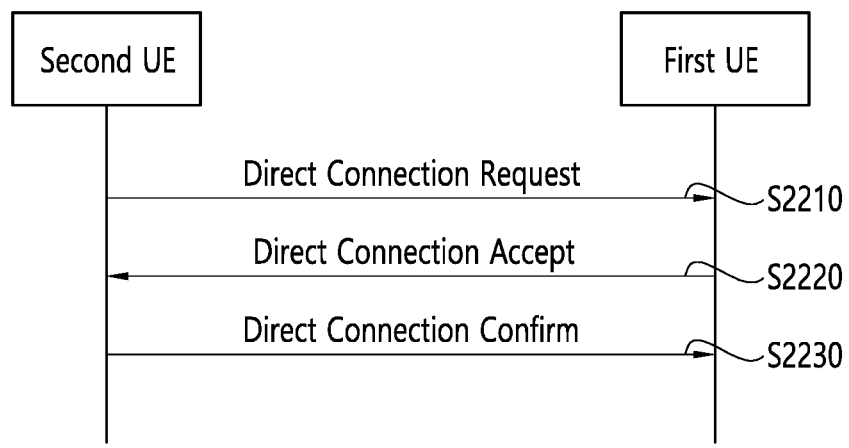
FIG. 22 shows a connection establishment procedure according to an embodiment of the present invention.

FIG. 22 shows a connection establishment procedure according to an embodiment of the present invention.

Referring to FIG. 22, in step S2210, the potential second UE may send a direct connection request message to the first UE. The direct connection request message may include at least one of the following information:

1) Available service information

The available service information may indicate services which the host UE is able to offer. The available service information may further indicate the type of supported direct connection. For instance, the type of supported direct connection may be at least one of unicast, multicast, receive only, transmit only or both receive and transmit.

2) Supported QoS level for the available services, which indicates the QoS level for the service potentially offered by the host UE 3) Supported sidelink capability information 4) Flag that this is a service announcement The Flag helps other second UE to distinguish the direct connection request sent by the first UE from the direct connection request sent by the potential second UE. Note that this direct connection request message may be essentially for broadcasting the available services that can be offered.

In step S2220, the first UE may send a direct connection accept message to the potential second UE. The direct connection accept message may include at least one of the following information:

1) The information included in the direct connection request message of the step S1810 may be included in the direct connection accept message of the step S2220.

2) ID of the potential second UE may be included in the direct connection accept message to resolve the potential ID confusion issue.

The direct connection accept message can be addressed by unicast ID over layer 1 and layer 2. The first UE starts T_CONN3 upon sending the direct connection accept message. Upon expiry of T_CONN3, the first UE considers that the connection establishment fails.

In step S2230, the potential second UE may send a direct connection confirm message to the first UE. The direct connection confirm message may include the information included in the direct connection accept message of the step S1830.

The potential second UE starts T_CONN4 upon sending the direct connection confirm message. Upon receiving the direct connection confirm message, the first UE stops T_CONN3. If the potential second UE identifies that the requested service is actually on-going (e.g. by monitoring the packet transmission over the establishment link over both communication direction), it resets T_CONN4. Upon expiry of T_CONN4, the potential second UE considers that the connection establishment fails and releases the connection and therefore release resources prepared for the first UE.

Figure 23:
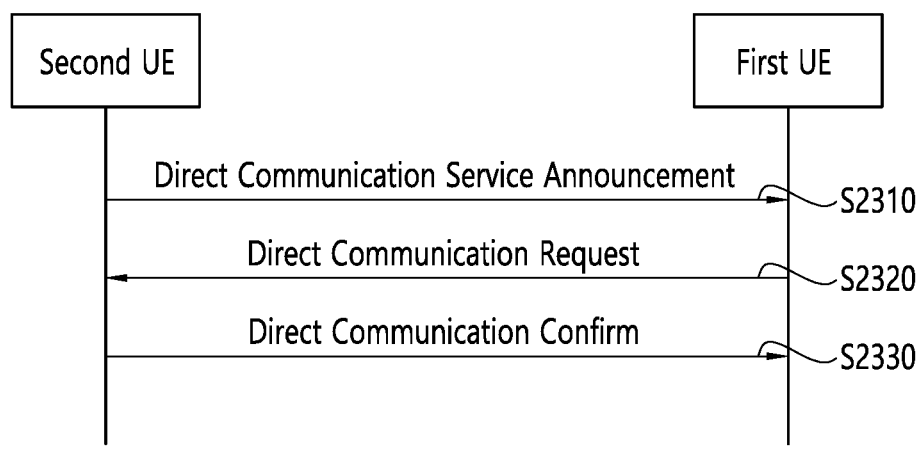
FIG. 23 shows a connection establishment procedure according to an embodiment of the present invention.

FIG. 23 shows a connection establishment procedure according to an embodiment of the present invention.

Referring to FIG. 23, in step S2310, the potential second UE may send a direct communication service announcement message to the first UE. The direct communication service announcement message may include available service information which indicates services which the host UE is able to offer.

In step S2320, the first UE may send a direct communication request message to the potential second UE. The direct communication request message may include at least one of the following information:

1) The information included in the direct connection request message of the step S1810 may be included in the direct communication request message of the step S2320.

2) ID of the potential second UE may be included in the direct communication request message to resolve the potential ID confusion issue.

The direct communication request message can be addressed by unicast ID over layer 1 and layer 2. The first UE starts T_CONN3 upon sending the direct communication request message. Upon expiry of T_CONN3, the first UE considers that the connection establishment fails.

In step S2330, the potential second UE may send a direct communication confirm message to the first UE. The direct communication confirm message may include the information included in the direct connection accept message of the step S1830.

The potential second UE starts T_CONN4 upon sending the direct communication confirm message. Upon receiving the direct communication confirm message, the first UE stops T_CONN3. If the potential second UE identifies that the requested service is actually on-going (e.g. by monitoring the packet transmission over the establishment link over both communication direction), it resets T_CONN4. Upon expiry of T_CONN4, the potential second UE considers that the connection establishment fails and releases the connection and therefore release resources prepared for the first UE.

Figure 24:
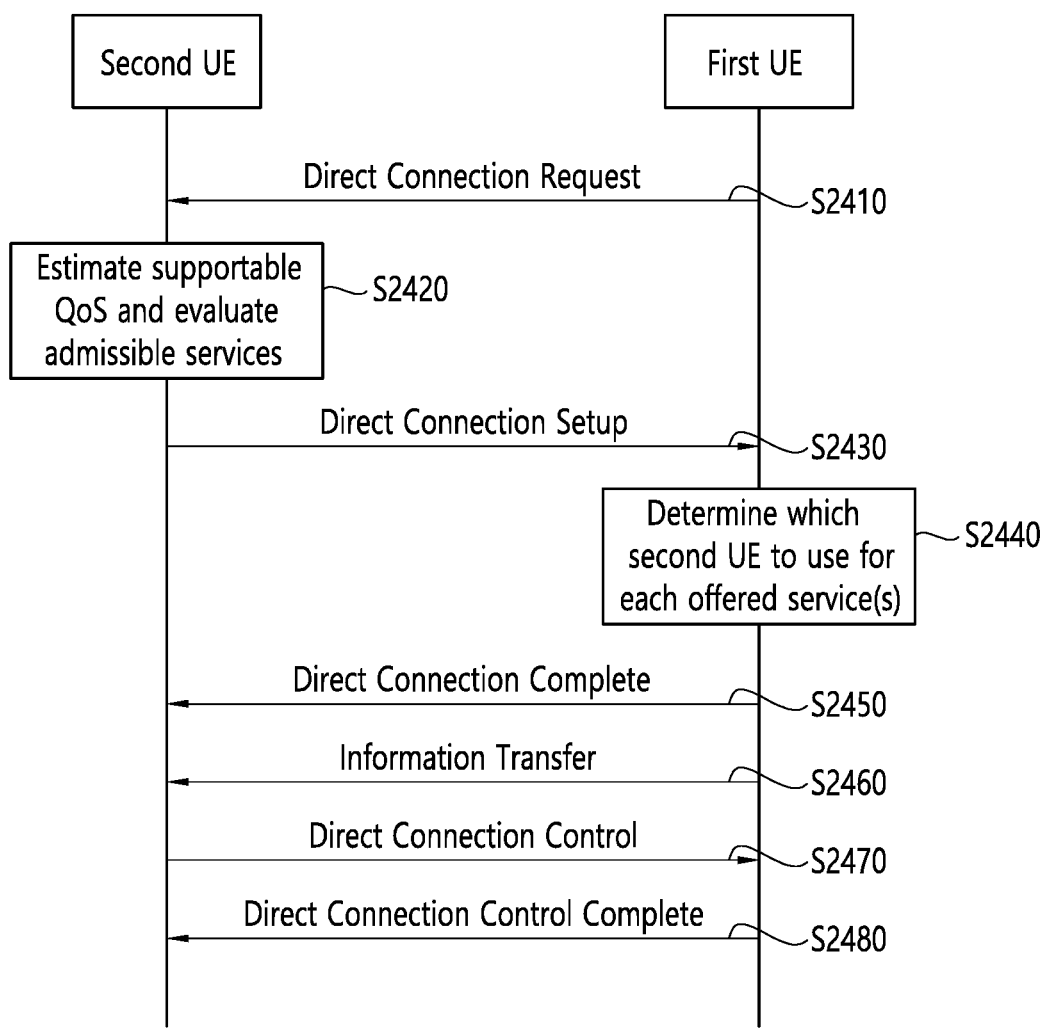
FIG. 24 shows a connection establishment procedure according to an embodiment of the present invention.

FIG. 24 shows a connection establishment procedure according to an embodiment of the present invention.

Referring to FIG. 24, in step S2410, the first UE may transmit a direct connection request message to request establish direct connection setup between the first UE and other UE (e.g. potential second UE or second UE) for service(s) requested by the first UE. For instance, the first UE may send the direct connection request message via broadcast by including broadcast L2 ID in the L2 header of the direct connection request message.

If L1 destination ID may be indicated over e.g. physical sidelink control channel to inform the transmission of the direct connection request message via broadcast, a broadcast L1 ID as destination ID may be indicated. If L1 destination ID may be indicated over e.g. physical sidelink control channel to inform resource reservation for transmission of the direct connection request message via broadcast, a broadcast L1 ID as destination ID may be indicated. L2 destination ID for broadcast may be indicated in MAC header for the transmitted transport block.

If the first UE already identified the ID of the potential second UE, the first UE may send the direct connection request message via unicast by addressing the potential second UE within the destination field for the transmission of this message. If L1 destination ID is indicated over e.g. physical sidelink control channel to inform the transmission of the direct connection request message via unicast, a unicast L1 ID as destination ID may be indicated. If L1 destination ID is indicated over e.g. physical sidelink control channel to inform resource reservation for transmission of the direct connection request message via unicast, a unicast L1 ID as destination ID may be indicated. If L2 destination ID is indicated in MAC header of the transmitted transport block such that receiving MAC is able to identify that this transport block is for unicast traffic. The direct connection request message may include at least one of the following information:

1) Service information that the first UE wants to get

The interesting/requested service may be indicated by service Identifier (SID) or service code (SCD). Multiple services may be indicated by listing the SIDs or SCDs.

2) Requested QoS information

The requested QoS information may indicate the required/desired QoS level for the requested service. The requested QoS information may need to be indicated per service level, if multiple services are requested. The requested QoS information may include at least one of the following QoS information:

2.1) Required QCI value or 5QI or new QoS indicator value representing the (partial) set of the QoS parameters: payload (bytes), transmission rate (message/sec or packets/sec), maximum end-to-end latency (ms), target communication range, reliability (%) or data rate (Mbps). The data rate may further indicate at least one of the following information:

Average data rate which indicates the desired data rate when channel is not congested.

Minimum data rate which indicates the minimum data rate which the associated services require to maintain the service. If the service requires guaranteed bit rate, this information is necessarily included.

Aggregated Maximum Bit Rate (AMBR) which indicates the maximum data rate to be supported over the requested PC5 direct communication.

2.2) If QCI or 5QI or the new QoS indicator cannot represent all the parameters presented above, the parameters not covered by the QoS indicator may be indicated together with the QoS indicator.

2.3) Minimum required communication range (meters)

2.4) Need for QoS prediction

The need for QoS prediction may indicate whether the requested service requires QoS prediction functionality, where QoS prediction functionality allows the served UE to be aware of the change of the expected QoS in advance (e.g. a certain QoS level is expected to degrade in 10 seconds).

The need for QoS prediction may further indicate the minimum timing advance by which the QoS change notification based on QoS prediction is notified to the first UE prior to the moment of actual QoS change.

The need for QoS prediction may further indicate the need for periodic update of QoS prediction notification to the first UE. The need for QoS prediction may further indicate the periodicity of the requested QoS prediction notification.

2.5) Need for supporting guaranteed QoS

This IE may indicate whether the requested service requires guaranteed QoS. The required QoS may be defined for a certain period of time. The period of time may indicate the minimum time period for which the promised QoS can be ensured. In this usage of the IE, the IE may further indicate the time period for which the requested QoS needs to be maintained This IE may be indicated with a minimum probability that the requested QoS needs to be satisfied.

3) Connection information

Type of direct connection: this IE may be either of "unicast" or "multicast" or "broadcast". In case this IE is not present, it indicates "unicast" by default.

Direction of direct connection: this IE may be either of "unidirectional with receiving only" or "unidirectional transmitting only" or "bidirectional".

Each service information being requested should be associated with one type of direct connection request. For this purpose, the connection information IE may need to be indicated per each service ID being requested.

4) Max waiting time for direct connection setup

This information may indicate the maximum waiting time for which the first UE can wait until establishment of requested direct communication since the connection is initially requested. To make sure that the potential second UE know when the connection was initially requested, the time information indicating the moment of initially constructing the direct connection request at the first UE may need to be included in the direct connection request message.

5) Initial ID of the first UE;

This ID may be layer-2 ID of the first UE. If this L2 ID is indicated, the potential second UE needs to use this L2 ID to address the first UE by including the L2 ID in the L2 header of the message destined to the first UE. If this L2 ID is not indicated, the potential second UE needs to use the L2 ID included in the L2 header of this direct connection request message.

Alternatively, this ID may be upper layer ID of the first UE. This ID may be used by upper layer of the receiving second UE to address the first UE 6) UE subscription information or subscribed PLMN information The subscribed PLMN information may indicate the home PLMN of the UE for cellular services including PC5. The subscribed PLMN information may indicate the PLMN(s) for which PC5 operations are granted for the UE. The subscribed PLMN information may indicate the PLMN(s) for which PC5 operations for the requested services are granted for the UE. The subscribed PLMN information may need to signalled per service. The subscribed PLMN information may further indicate at least one of the following information:

Home PLMN per RAT: this is the case when UE supports multiple RATs and each RAT is associated with same or different home PLMNs (e.g. Dual SIM Dual Active, DSDA)

Supported RATs per allowed PLMN;

Allowed operation: this indicates which of the following operations are allowed for the PLMNs (e.g. transmission only, reception only, or both transmission and reception)

For failure handing, upon sending the direct connection request message, the first UE starts a timer T_CONN. If T_CONN expires, the first UE considers that the connection request fails. The first UE starts a timer T_INT.

While the T_INT is running, the first UE is not allowed to request direct connection setup for the same service with the same QoS requirements. The T_INT is managed per a set of services requested in the same message. Therefore, multiple T_INT may be running at the same time. The value of T_CONN and T_INT can be configured to the first UE by network or those values can be preset.

While T_INT is running, the first UE is allowed to initiate direct connection setup, if it want to request a new service. While T_INT is running, the first UE is allowed to initiate direct connection setup while T_INT is running if it want to request a new service. While T_INT is running, the first UE is allowed to initiate direct connection setup while T_INT is running if it wants to request a service that resulted in the running T_INT with different QoS requirements.

In step S2420, the second UE may estimate supportable QoS and evaluate admissible services. Upon receiving the direct connection request message from other UE (i.e. first UE), a potential second UE performs the following to determine if it accepts the direct connection request received from the first UE:

if the potential second UE can offer at least one of the requested services, and/or if the potential second UE can support the requested type of direct connection, and/or if the potential second UE ensures that the first UE has a valid subscription on the requested services, e.g. in terms of PLMN, and/or if the potential second UE ensures that the first UE is not forbidden for the requested service and for the requested type of direct connection.

If all these conditions are satisfied, the potential second UE may decide to accept the direct connection request. If at least one of these conditions is satisfied, the potential second UE may decide to accept the direct connection request. Depending on considered embodiments, a subset of the above conditions can be checked.

In step S2430, if the potential second UE accepts the direct connection request, the second UE may send the direct connection setup message. In FIG. 24, it is assumed that the second UE accepts the direct connection request. The direct connection setup message may include at least one of the following information:

1) Accepted service ID/code

If the first UE has requested a single service ID/code, then this ID/code needs not be included.

2) Traffic flow information

For the accepted service(s), the associated traffic flow ID may be indicated. This traffic flow ID may be used when host addresses or identifies a particular traffic flow of the connection for sidelink communication. This flow ID may be used for radio resource configuration as given below.

3) Sidelink capability information

The sidelink capability information may indicate the capabilities of the second UEs about transmission and/or reception over direct communication interface. Transmission capabilities and reception capabilities may need to be indicated separately. This second UE includes reception capabilities if the direction of direct communication requested by the first UE is "unidirectional with transmit only" or "bidirectional".

4) Radio resource configuration for sidelink

The radio resource configuration for sidelink may indicate the radio resource parameters to be used for the direct communication link being established. This IE may include at least one of the following:

4.1) Initial ID of the second UE

This ID can be upper layer ID of the second UE. This ID can be used by upper layer of the first UE to address the second UE. This ID can be layer-2 ID of the second UE. If this L2 ID is indicated, the first UE needs to use this L2 ID to address the second UE by including the L2 ID in the L2 header of the message destined to the second UE. If this L2 ID is not indicated, the first UE needs to use the L2 ID included in the L2 header of this direct connection setup message.

4.2) Sidelink resource pool structure which indicates the following information:

Control channel structure: time-frequency resources comprising physical sidelink control channel Data channel structure: time-frequency resources comprising physical sidelink data channel Multiple resource pools may be indicated. For each resource pool, associated services/traffic flow ID(s) may be indicated. Alternatively, for each service/traffic flow ID, the associated resource pool(s) may be indicated. Note that this mapping of resource pool to service/traffic flow ID implies the mapping of frequency (channel) to service.

4.3) Scheduling mode

This indicates the transmission resource selection scheme that the first UE shall use.

Network-scheduled resource selection; this can be set only if the first UE has indicated that it is in network coverage.

Second UE-scheduled resource selection;

First UE autonomous resource selection; First UE autonomous resource selection can be a default mode.

This configuration can be per UE. Alternatively, this configuration is provided per service/traffic flow such that a service/traffic flow with more stringent QoS requirements are differently treated possibly with a tighter control.

4.4) Synchronization configuration

This indicates the synchronization reference source to be used for direct communication being established. For instance, information may indicate that GNSS is a prioritized synchronization reference. For instance, information may indicate that UE-transmitted synchronization (e.g. SLSS) is a prioritized synchronization reference. For instance, information may indicate that downlink synchronization signal is a prioritized synchronization reference. For instance, information may indicate the priority of synchronization reference among downlink synchronization signal, GNSS and UE-transmitted synchronization signal. For instance, information may indicate that the second UE is a synchronization reference. In this case, the information may be synchronization signal identification information, e.g. SLSS ID to be used by the second UE for SLSS transmission. For instance, information may indicate that the first UE is a synchronization reference. In this case, the information may be synchronization signal identification information, e.g. SLSS ID to be used by the first UE for SLSS transmission. For instance, information may indicate that distributed synchronization reference is used. If no information is provided on synchronization configuration, the first UE keeps using the present synchronization method.

4.5) HARQ configuration;

This configuration can be per UE. Alternatively, this configuration is provided per service/traffic flow such that a service/traffic flow with more stringent QoS requirements are differently treated possibly with a tighter control.

HARQ retransmission configuration: This configuration may indicate whether HARQ retransmission is based on HARQ feedback or whether HARQ retransmission is performed without HARQ feedback.

Feedback configuration: HARQ feedback signalling method to be used for the direct communication. This configuration may indicate whether HARQ feedback is required or not. This information may need to be indicated per each communication direction (from/to first UE) depending on the capabilities of HARQ of the first UE and the second UE as well as direction of direct communication being established. This information may needs to be indicated per communication direction per accepted service/traffic flow;

Number of HARQ processes, e.g., number of HARQ processes to be used by the first UE or number of HARQ processes to be used by the second UE Number of retransmissions: The number of HARQ retransmission may be indicated. The number of HARQ retransmission may be configured for the case when HARQ retransmission is configured to be performed without HARQ feedback (i.e. blind HARQ retransmission). In this case the number of blind retransmissions may be further defined or indicated by the configuration. In this case, HARQ combining is applied to the received transport blocks including a new transmission and up to the number of retransmissions. The number of HARQ retransmission may be configured for the case when HARQ retransmission is configured to be performed with HARQ feedback (i.e. HARQ feedback basedHARQ retransmission). In this case the number of blind retransmissions may indicate the outcome of the transmissions for which HARQ feedback is generated. For example, 1 retransmission number is configured for HARQ with HARQ feedback, the second UE needs to send HARQ NACK if the collective outcome of receiving two transmissions (one new transmission+one retransmission) indicates an unsuccessful transmissions.

4.6) Transmit power control configuration

This configuration can be per UE. Alternatively, this configuration is provided per service/traffic flow such that a service/traffic flow with more stringent QoS requirements are differently treated possibly with a tighter control.

Power control method, e.g., open loop power control or closed loop power control Power control parameter including base transmit power (Po) and/or step power adjustment level (Pi). For instance, the first UE needs to transmit with transmit power Po when ignoring Pi. For instance, signalled Pi can be a single integer value with either plus or minus value. For instance, signalled Pi can be a value within a range. The first UE needs to transmit with transmit power Po+accumulated value of received Pi's.

5) Transaction ID

This transaction ID uniquely identifies the message contents. If the message is retransmitted to achieve diversity gain due to less-robust nature of D2D networks, the transaction ID is the same. For the same direct connection setup procedure, the transaction ID is the same.

The direct connection setup message is desirably addressed only to the first UE by setting the destination field of this message to first UE ID such that other UE receiving this message can ignore the message. The destination field for the transmission of the message may exist in layer 1 where control channel indicates the field and layer 2 where MAC header indicates the field.

For failure handling, upon sending the direct connection setup message, the potential second UE starts a timer T_CONN2. If T_CONN2 expires, the potential second UE considers that the connection establishment for direct communication fails.

In step S2440, upon receiving the direct connection setup message, the first UE may perform the following to determine if the first UE accepts the direct connection setup:

if the accepted services are sufficient/acceptable for the first UE to establish the direct connection with the second UE, and/or if the first UE ensures that the second UE has a valid subscription to provide the accepted services, e.g. in terms of PLMN, and/or if the first UE ensures that the second UE is not forbidden for providing the requested service.

In step S2450, if all or at least one of these conditions are satisfied, the first UE may decide to establish the direct connection with the second UE and send direct connection complete message carrying the following information:

Confirmed service information including a list of services that the first UE wants over the direct connection being established ID of the second UE to which the direct connection complete message is destined.

Further, the direct connection complete message may also include the following information:

Sidelink capability information, and/or
UE status information, and/or
Requested QoS information, and/or
Connection information The above four information may increase the size of the direct connection complete message. If the size of the direct connection complete message is larger than a threshold, the first UE may defer sending the information in the information transfer message.

If the first UE intends to send the information transfer message immediately after the direct connection complete message, the first UE may include a kind of information indicating that in the direct connection complete message that the information transfer message transmission follows. Upon receiving this information or indication, the second UE defers sending the direct connection control message until receiving the information transfer message. If this information or indication is not included in the direct connection complete message, the second UE immediately sends the direct connection control message upon receiving the direct connection complete message.

If the first UE decides to reject the direct connection with the second UE, it sends the direct connection reject message including ID of the second UE to which the direct connection reject message is destined.

Alternatively, if the first UE decides to reject the direct connection with the second UE, it does not send any message. In this embodiment, the potential second UE will eventually identify the failure of the connection of direct communication based on expiry of a timer that started upon transmission of the direct connection setup message.

Note that the direct connection complete message is necessary to resolve the case where more than two host UEs replies with direct communication setup message. This works as follows. If the potential second UE B receives, from the first UE to which the potential second UE B sends the direct connection setup message, the direct connection complete message that includes a ID of the first and a ID of the potential second UE A that is different from a ID of the potential second UE B included in the direct connection setup message, the potential second UE B may consider that the connection establishment procedure fails. And, the potential second UE B may stop any further processing related to the direct connection request message received from the first UE and release any resources prepared for the first UE.

For the direct connection request message to the direct connection complete message for the same transaction of direct connection setup, the same transaction ID is included in the direct connection request message to the direct connection complete message.

In step S2460, after sending the direct connection complete message, the first UE may send the information transfer message to the second UE. The information transfer message may include at least one of the following information:

Sidelink capability information, and/or
UE status information, and/or
Requested QoS information, and/or
Connection information Any of the information already included in the direct connection complete message is not included again in the information transfer message as long as the contents are the same.

In step S2470, upon receiving the direct connection complete message that is not followed by the information transfer message or receiving the information transfer message, the second UE may send the direct connection control message. The direct connection control message may include at least one of the following information:

Offered QoS information, and/or
Radio resource configuration for sidelink, and/or
Transaction ID, and/or
Activation time of the radio resource configuration included in the information transfer message. Upon receiving this information, the first UE keeps applying the previously used configuration until the time indicated by the activation time and applies the radio resource configuration in the information transfer message since the time indicated by the activation time. The value of activation time can be preset. If this information is not included, the first UE applies the configuration in the direct connection control message upon receiving the direct connection control message.

Upon sending the direct connection control message, the second UE starts a timer T_5.

Alternatively, upon receiving the direct connection complete message that is not followed by the information transfer message or receiving the information transfer message which includes the information indicating the required quality of service and/or required sidelink capabilities that cannot be supported by the second UE, the second UE sends the direct connection release message to the first UE, including in the direct connection release message the cause of the connection release.

In step S2480, upon receiving the direct connection control message, the first UE sends the direct connection control complete message to the second UE. The direct connection control complete message may include the transaction ID of the direct connection control message that triggered sending the direct connection control complete message. Upon receiving the direct connection control complete message, the second UE stops T_5 and considers that the first UE is ready to apply the new configuration provided in the direct connection complete message and may send control message to the first UE to activate the configuration included in the direct connection control message. If T_5 expires, the second UE considers that transmission of the direct connection control message fails.

Hereinafter, according to an embodiment of the present invention, provisioning of connection setup by a network will be described.

A network (e.g. base station) may configure the unicast setup policy to the UE. For instance, the unicast setup policy may be 'via direct communication procedure only' or 'via network authorization whenever possible, and via direct communication procedure otherwise'.

The first UE may check the unicast setup policy before the unicast setup. The second UE may check if the first UE that has sent the direct connection request is authorized UE for the direct connection. For this, the second UE query this UE by providing some information. For instance, the network check if allowance, then sends to the second UE allowance, then direct setup is allowed.

This invention may propose procedures of direct connection management (e.g. connection setup) that allows admission control as well as prediction of supportable QoS based on assistance information exchange for direct communication, where the assistance information is transmitted/received during a direct connection setup procedure or during normal direct communication that may have been initiated with/without an explicit direct connection setup procedure. Specifically, this invention may allow UEs (e.g. the first UE and the second UE) to negotiate QoS by exchanging properly designed assistance information, and the negotiation may be performed during/after the direct connection setup procedure. This invention may allow the second UE to make the best estimate of the supported QoS over the potential direct connection link for the requested services with requested QoS. Further, this invention may enable the second UE to choose the admissible services for the first UE. In addition, this invention may allow the first UE to choose the best second UE when multiple second UE candidates are available.

Figure 25:
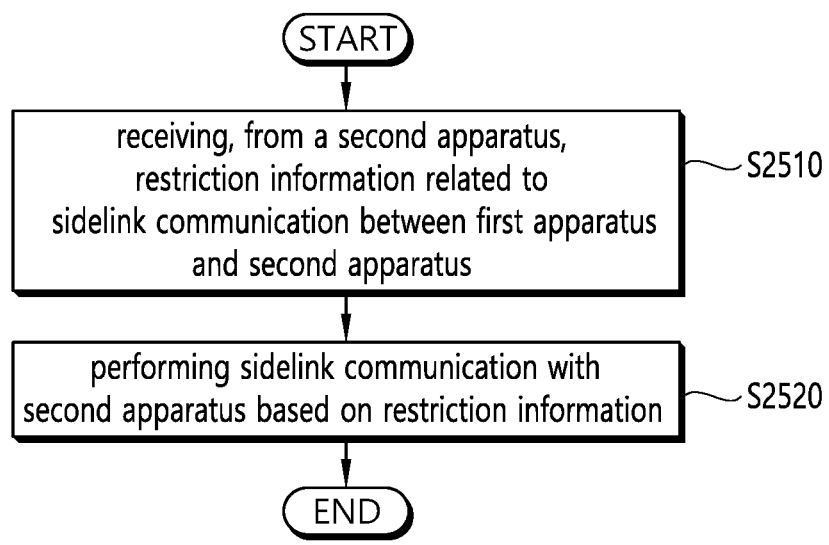
FIG. 25 shows a method for performing sidelink communication by a first apparatus (9010) according to an embodiment of the present invention.

FIG. 25 shows a method for performing sidelink communication by a first apparatus (9010) according to an embodiment of the present invention.

Referring to FIG. 25, in step S2510, the first apparatus (9010) may receive, from a second apparatus (9020), restriction information related to the sidelink communication between the first apparatus (9010) and the second apparatus (9020).

In step S2520, the first apparatus (9010) may perform the sidelink communication with the second apparatus (9020) based on the restriction information.

For instance, performing the sidelink communication with the second apparatus (9020) may comprise: determining whether or not to establish a connection with the second apparatus (9020) based on the restriction information.

For instance, performing the sidelink communication with the second apparatus (9020) may comprise: determining transmission parameters for the sidelink communication based on the restriction information.

According to an embodiment of the present invention, the restriction information may include information on transmission resources or reception resources of the second apparatus (9020). In this case, performing the sidelink communication with the second apparatus (9020) may comprise: selecting transmission resources for the sidelink communication based on the information on transmission resources or reception resources included in the restriction information. In this case, further, performing the sidelink communication with the second apparatus (9020) may comprise: performing sidelink transmission with the selected transmission resources. For instance, the transmission resources selected by the first apparatus (9010) may be different from the transmission resources or the reception resources of the second apparatus (9020). Further, the second apparatus (9020) may select transmission resources for the sidelink communication based on the information on transmission resources or reception resources of the second apparatus (9020).

According to an embodiment of the present invention, the restriction information may include HARQ capability of the second apparatus (9020). The HARQ capability of the second apparatus (9020) may include at least one of whether the second apparatus (9020) supports sidelink HARQ feedback, whether the second apparatus supports HARQ combining, or maximum number of the sidelink HARQ processes supported by the second apparatus (9020). In this case, performing the sidelink communication with the second apparatus (9020) may comprise: determining whether retransmissions need to be performed based HARQ feedback on transmissions or whether retransmissions need to be performed without HARQ feedback (i.e. blind retransmission needs to be used in case the second apparatus does not support HARQ feedback but supports HARQ combining) determining transmission resources and/or retransmission resources for the sidelink communication based on the HARQ capability included in the restriction information. In this case, further, performing the sidelink communication with the second apparatus (9020) may comprise: performing sidelink transmission and/or sidelink retransmission with the determined transmission resources and/or retransmission resources.

According to an embodiment of the present invention, the restriction information may include at least one of required quality of service (QoS) level for a service requested by the second apparatus (9020), sidelink capability information of the second apparatus (9020), initial ID of the second apparatus (9020), UE status information of the second apparatus (9020), UE subscription information of the second apparatus (9020), or scheduling mode preferred by the second apparatus (9020). The above-described various information included in the restriction information has already been described in detail in FIG. 18, and therefore, detailed description of various information included in the restriction information will be omitted.

For instance, the first apparatus (9010) or the second apparatus (9020) may include at least one of a terminal, a user equipment (UE), a wireless device, a wireless communication device, a vehicle, a vehicle equipped with an autonomous driving function, a connected car, a unmanned aerial vehicle (UAV), an artificial intelligence (AI) module, a robot, an augmented reality (AR) device, a virtual reality (VR) device, a mixed reality (MR) device, a hologram device, a public safety device, a machine type communication (MTC) device, an internet of things (IoT) device, a medical device, a pin-tech device (or financial device), a security device, or a climate/environmental device.

Hereinafter, apparatus to which the present invention is applicable will be described.

Figure 26:
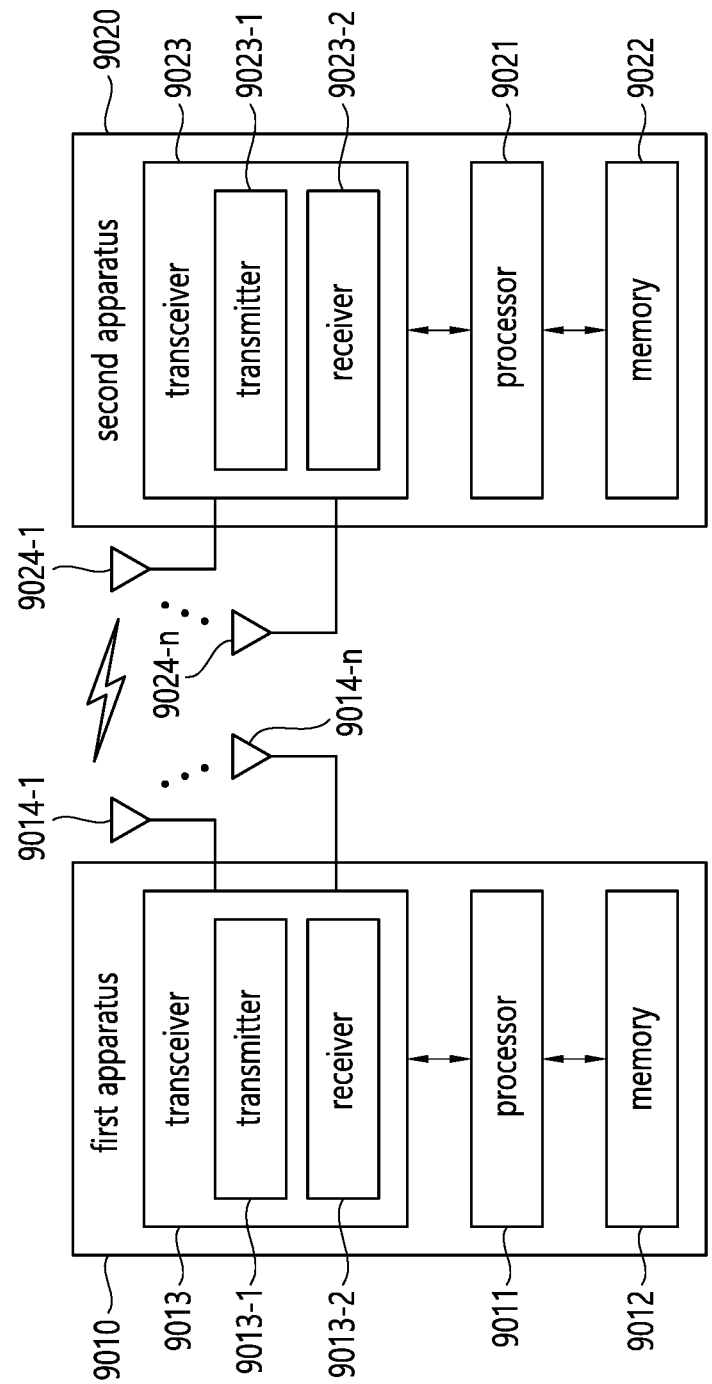
FIG. 26 shows a wireless communication apparatus according to an embodiment of the present invention.

FIG. 26 shows a wireless communication apparatus according to an embodiment of the present invention.

Referring to FIG. 26, a wireless communication system may include a first apparatus (9010) and a second apparatus (9020).

The first apparatus (9010) may be a base station, a network node, a transmitting terminal, a receiving terminal, a wireless device, a wireless communication device, a vehicle, a vehicle equipped with an autonomous driving function, a connected car, a unmanned aerial vehicle (UAV), an artificial intelligence (AI) module, a robot, an augmented reality (AR) device, a virtual reality (VR) device, a mixed reality (MR) device, a hologram device, a public safety device, a machine type communication (MTC) device, an internet of things (IoT) device, a medical device, a pin-tech device (or financial device), a security device, a climate/environmental device, devices related to 5G services, or other devices related to fourth industrial revolution fields.

The second apparatus (9020) may be a base station, a network node, a transmitting terminal, a receiving terminal, a wireless device, a wireless communication device, a vehicle, a vehicle equipped with an autonomous driving function, a connected car, a unmanned aerial vehicle (UAV), an artificial intelligence (AI) module, a robot, an augmented reality (AR) device, a virtual reality (VR) device, a mixed reality (MR) device, a hologram device, a public safety device, a machine type communication (MTC) device, an internet of things (IoT) device, a medical device, a pin-tech device (or financial device), a security device, a climate/environmental device, devices related to 5G services, or other devices related to fourth industrial revolution fields.

For example, the terminal may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tech device may be a device capable of providing financial services such as mobile payment. For example, the pin-tech device may include a payment device or a point of sales (POS). For example, the climate/environmental device may include a device for monitoring or predicting a climate/environment.

The first apparatus (9010) may include at least one processor, such as a processor (9011), at least one memory, such as a memory (9012), and at least one transceiver, such as a transceiver (9013). The processor (9011) may perform the functions, procedures, and/or methods described above. The processor (9011) may perform one or more protocols. The processor (9011) may perform one or more layers of a radio interface protocol. The memory (9012) may be connected to the processor (9011) and store various types of information and/or commands. The transceiver (9013) may be connected to the processor (9011) and controlled to transmit/receive a radio signal. The transceiver (9013) may be connected to one or more of the antennas (9014-1 to 9014-n). In the present specification, the n antennas may be the number of physical antennas or the number of logical antenna ports.

The second apparatus (9020) may include at least one processor, such as a processor (9021), at least one memory, such as a memory (9022), and at least one transceiver, such as a transceiver (9023). The processor (9021) may perform the functions, procedures, and/or methods described above. The processor (9021) may implement one or more protocols. For example, the processor (9021) may implement one or more layers of the radio interface protocol. The memory (9022) may be connected to the processor (9021) and store various types of information and/or commands. The transceiver (9023) may be connected to the processor (9021) and controlled to transmit/receive a radio signal. The transceiver (9023) may be connected to one or more of the antennas (9024-1 to 9024-n).

The memory (9012) and/or the memory (9022) may be each connected inside or outside the processor (9011) and/or the processor (9021) and connected to other processors through various techniques such as wired or wireless connection.

According to an embodiment of the present invention, the processor (9011) may control the transceiver (9013) to receive, from a second apparatus (9020), restriction information related to the sidelink communication between the first apparatus (9010) and the second apparatus (9020). Then, the processor (9011) may perform the sidelink communication with the second apparatus (9020) based on the restriction information. The procedures and/or schemes suggested in the present specification may be applied to the first apparatus (9010) and the second apparatus (9020).

Figure 27:
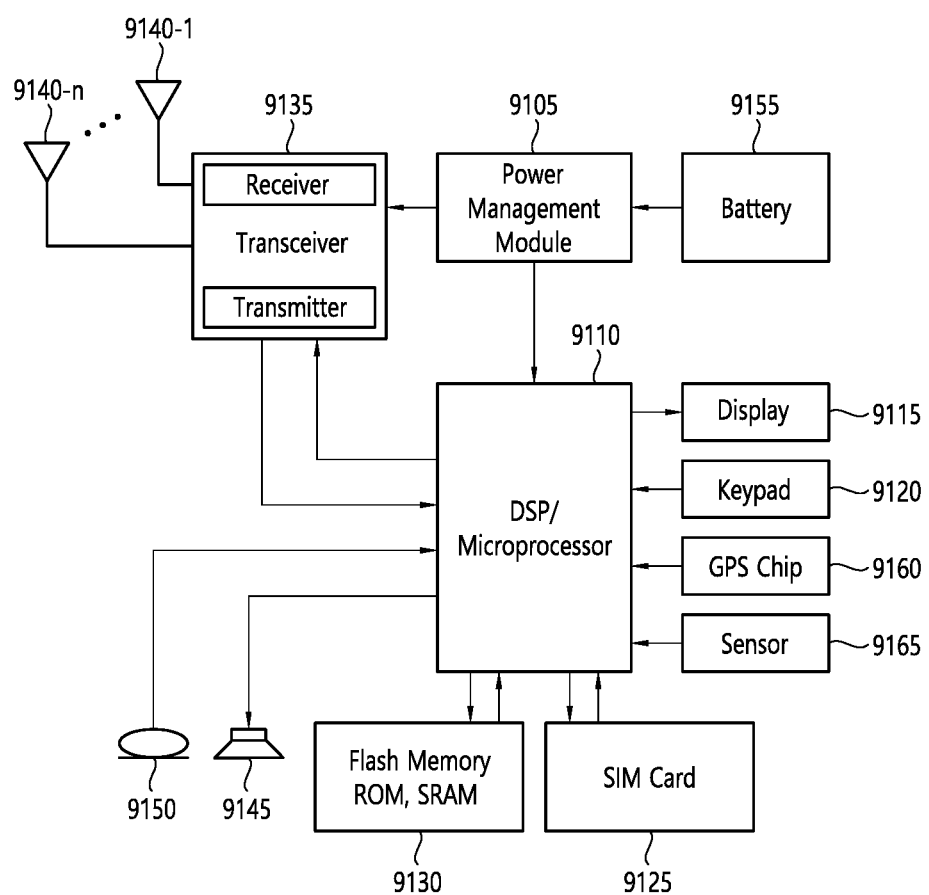
FIG. 27 shows a wireless communication device according to an exemplary embodiment of the present invention.

FIG. 27 shows a wireless communication device according to an exemplary embodiment of the present invention.

FIG. 27 may correspond to a more detailed diagram of a first device or second device (9010, 9020) shown in FIG. 26. However, the wireless communication device of FIG. 27 is not limited to the user equipment (UE). The wireless communication device may correspond to a random appropriate mobile computer device being configured to perform one or more embodiments of the present invention, such as a vehicle communication system or device, a wearable device, a portable computer, a smartphone, and so on.

Referring to FIG. 27, the user equipment (UE) may include at least one or more processors (e.g., DSP or microprocessor), such as a processor (9110), a transceiver (9135), a power management module (9105), an antenna (9140), a battery (9155), a display (9115), a keypad (9120), a Global Positioning System (GPS) chip (9160), a sensor (9165), a memory (9130), (optionally) a subscriber identification module (SIM) card (9125), a speaker (9145), a microphone (9150), and so on. The user equipment may include one or more antennas.

The processor (9110) may be configured to perform the above-described functions, procedures and/or methods of the present invention. According to an exemplary embodiment of the present invention, the processor (9110) may perform one or more protocols, such as layers of a radio interface protocol.

The memory (9130) is connected to the processor (9110) and may store information related to the operation of the processor (9110). The memory (9130) may be located inside or outside of the processor (9110), and the memory (9130) may also be connected to another processor via diverse technologies, such as wired or wireless connection.

A user may input diverse types of information (e.g., command information, such as phone numbers) by using diverse techniques, such as pushing a button of the keypad (9120) or voice activation using the microphone (9150). The processor (9110) may receive and process user information and may execute proper functions, such as making a phone call by dialing a phone number. For example, data (e.g., operation data) may be searched from the SIM card (9125) or the memory (9130) in order to execute the respective functions. As another example, the processor (9110) may receive and process GPS information from the GPS chip (9160) in order to execute functions related to the position of the UE, such as vehicle navigation, map service, and so on. As yet another example, the processor (9110) may indicate diverse types of information and data to the display (9115) for referential usage or convenience of the user.

The transceiver (9135) may be connected to the processor (9110) may transceive (transmit and receive) radio signals, such as RF signals. The processor (9110) may control the transceiver (9135) so that the transceiver (9135) can initiate communication and transmit radio signals including diverse types of information or data, such as voice communication data. The transceiver (9135) may include a receiver and a transmitter in order to transmit or receive radio signals. The antenna (9140) may easily perform transmission and reception of radio signals. According to the exemplary embodiment, when receiving radio signals, the transceiver (9135) may forward and convert the signals to a baseband frequency in order to process the signals by using the processor (9110). The processed signals may be processed in accordance with diverse technologies, such as converting the processed signals to information that can be heard by being outputted through the speaker (9145) or information that can be read.

According to the exemplary embodiment of the present invention, the sensor (9165) may be connected to the processor (9110). The sensor (9165) may include at least one detection device being configured to discover diverse forms of information including speed, acceleration, light, oscillation, proximity, position, image, and so on, but not being limited only to the information types listed above. The processor (9110) may receive and process sensor information acquired from the sensor (9165) and may execute diverse types of functions, such as collision prevention, automatic driving, and so on.

In the example of FIG. 27, diverse components (e.g., camera, USB port, and so on) may be further included in the UE. For example, a camera may be connected to the processor (9110) and may be used for diverse services, such as automatic driving, vehicle safety service, and so on.

As described above, FIG. 27 is merely an example of the user equipment, and, therefore, the embodiment of the same will not be limited only to this. For example, some of the components (e.g., keypad (9120), GPS chip (9160), sensor (9165), speaker (9145), and/or microphone (9150)) may not be implemented in some scenarios.

The processor (9011, 9021 or 9110) may include an application-specific integrated circuit (ASIC), a separate chipset, a logic circuit, and/or a data processing unit. The memory (9012, 9022 or 9130) may include a read-only memory (ROM), a random access memory (RAM), a flash memory, a memory card, a storage medium, and/or other equivalent storage devices. The transceiver (9013, 9023 or 9135) may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor (9011, 9021 or 9110). The memory (9012, 9022 or 9130) may be located inside or outside the processor (9011, 9021 or 9110), and may be coupled to the processor (9011, 9021 or 9110) by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method for performing sidelink communication by a first apparatus, the method comprising:
   transmitting, to a second apparatus, a direct communication request message to establish unicast link, which includes an identifier of the first apparatus and information regarding at least one service type,
   wherein the direct communication request message further includes information regarding a security capability of the first apparatus, and
   wherein based on that an identifier of the second apparatus is provided, the direct communication request message further includes information regarding the identifier of the second apparatus;
   transmitting, to the second apparatus, quality of service (QoS) information related to the at least one service type;
   receiving, from the second apparatus, a direct communication accept message including an identifier of the second apparatus and the QoS information related to the at least one service type; and
   performing the sidelink communication based on the unicast link between the first apparatus and the second apparatus.

2. The method of claim 1, wherein the unicast link between the first apparatus and the second apparatus is established for the at least one service type based on the direct communication request message and the direct communication accept message.

3. The method of claim 1, wherein the identifier of the first apparatus is an upper layer identifier of the first apparatus, and the identifier of the second apparatus is an upper layer identifier of the second apparatus.

4. The method of claim 1, wherein the direct communication request message includes security information for an establishment of security between the first apparatus and the second apparatus.

5. The method of claim 1, wherein the QoS information includes at least one QoS indicator value representing guaranteed bit rate (GBR) or non-GBR.

6. The method of claim 1, wherein the QoS information includes at least one QoS indicator value representing priority and packet delay budget.

7. The method of claim 1, wherein the direct communication request message includes restriction information related to the sidelink communication between the first apparatus and the second apparatus.

8. The method of claim 7, wherein the restriction information includes information on transmission resources or reception resources of the first apparatus.

9. The method of claim 8, wherein, based on the information on transmission resources or reception resources included in the restriction information, transmission resources for the sidelink communication is selected by the second apparatus.

10. The method of claim 9, wherein the transmission resources selected by the second apparatus is different from the transmission resources or the reception resources of the first apparatus.

11. The method of claim 1, wherein the direct communication request message includes hybrid automatic repeat request (HARQ) capability of the first apparatus.

12. The method of claim 11, wherein the HARQ capability of the first apparatus includes at least one of whether the first apparatus supports sidelink HARQ feedback, whether the first apparatus supports HARQ combining, or maximum number of the sidelink HARQ process supported by the first apparatus.

13. The method of claim 12, wherein, based on the HARQ capability included in the direct communication request message, transmission resources or retransmission resources for the sidelink communication is determined by the second apparatus.

14. A first apparatus performing sidelink communication, the first apparatus comprising:
one or more memories storing instructions;
one or more transceivers; and
one or more processors operably connected to the one or more memories and the one or more transceivers, wherein the one or more processors execute the instructions to:
transmit, to a second apparatus, a direct communication request message to establish unicast link, which includes an identifier of the first apparatus and information regarding at least one service type,
wherein the direct communication request message further includes information regarding a security capability of the first apparatus, and
wherein based on that an identifier of the second apparatus is provided, the direct communication request message further includes information regarding the identifier of the second apparatus;
transmit, to the second apparatus, quality of service (QoS) information related to the at least one service type;
receive, from the second apparatus, a direct communication accept message including an identifier of the second apparatus and the QoS information related to the at least one service type; and
perform the sidelink communication based on the unicast link between the first apparatus and the second apparatus.

15. An apparatus configured to control a first user equipment (UE) to perform sidelink communication, the apparatus comprising:
one or more processors; and
one or more memories operably connected to the one or more processors and storing instructions, wherein the one or more processors execute the instructions to:
transmit, to a second apparatus, a direct communication request message to establish unicast link, which includes an identifier of the first apparatus and information related to at least one service type,
wherein the direct communication request message further includes information regarding a security capability of the first apparatus, and
wherein based on that an identifier of the second apparatus is provided, the direct communication request message further includes information regarding the identifier of the second apparatus;
transmit, to the second apparatus, quality of service (QoS) information related to the at least one service type;
receive, from the second apparatus, a direct communication accept message including an identifier of the second apparatus and the QoS information related to the at least one service type; and
perform the sidelink communication based on the unicast link between the first apparatus and the second apparatus.

* * * * *